(12) United States Patent
Chen et al.

(10) Patent No.: US 11,811,217 B2
(45) Date of Patent: Nov. 7, 2023

(54) FAULT PROTECTION APPARATUS AND PHOTOVOLTAIC POWER GENERATION SYSTEM

(71) Applicant: Huawei Digital Power Technologies Co., Ltd., Shenzhen (CN)

(72) Inventors: Dong Chen, Shanghai (CN); Lei Shi, Shanghai (CN); Jun Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/584,102

(22) Filed: Jan. 25, 2022

(65) Prior Publication Data

US 2022/0231499 A1 Jul. 21, 2022

Related U.S. Application Data

(63) Continuation of application No. PCT/CN2021/141683, filed on Dec. 27, 2021.

(30) Foreign Application Priority Data

Jan. 19, 2021 (CN) .......................... 202110069765.0

(51) Int. Cl.
*H02M 1/32* (2007.01)
*H02H 7/122* (2006.01)
(Continued)

(52) U.S. Cl.
CPC .............. *H02H 7/122* (2013.01); *H02H 3/38* (2013.01); *H02J 3/001* (2020.01); *H02M 1/32* (2013.01);
(Continued)

(58) Field of Classification Search
CPC ........ H02M 1/32; H02M 7/487; H02H 7/122; H02H 3/38; H02J 2300/24; H02J 3/001
See application file for complete search history.

(56) References Cited

U.S. PATENT DOCUMENTS 9,893,606 B1 2/2018 Kubouchi et al.
10,447,024 B2 10/2019 Sim
(Continued)

FOREIGN PATENT DOCUMENTS

CN 202772601 U 3/2013
CN 204290775 U 4/2015
(Continued)

OTHER PUBLICATIONS

Corea-Araujo et al. "Coordination and optimum design of hybrid circuit breakers for operation in multi-terminal HVDC systems," Electrical Engineering (2018) 100:2603-2616, Total 14 pages (Aug. 2018).
(Continued)

*Primary Examiner* — Harry R Behm
(74) *Attorney, Agent, or Firm* — Leydig, Voit & Mayer, Ltd.

(57) ABSTRACT

A photovoltaic power generation system includes a capacitor bridge arm, an inverter bridge arm, and the fault protection apparatus. The capacitor bridge arm includes a positive electrode output port, a negative electrode output port, and a reference output port The inverter bridge arm includes a positive electrode input port, a negative electrode input port, and a reference input port. The positive electrode input port is connected to the positive electrode output port. The negative electrode input port is connected to the negative electrode output port. The reference input port is connected to the reference output port by using the fault protection apparatus. The fault protection apparatus is turned off based on a magnitude value or a variation of a voltage, or a
(Continued)

magnitude value or a variation of a current between the reference input port and the positive electrode input port or the negative electrode input port.

16 Claims, 10 Drawing Sheets

(51) Int. Cl.
*H02J 3/00* (2006.01)
*H02H 3/38* (2006.01)
*H02M 7/487* (2007.01)

(52) U.S. Cl.
CPC .......... *H02J 2300/24* (2020.01); *H02M 7/487* (2013.01)

(56) References Cited

U.S. PATENT DOCUMENTS

| | | | |
|---|---|---|---|
| 10,770,987 | B2 | 9/2020 | Kumar et al. |
| 2014/0332500 | A1* | 11/2014 | Pessina .................. H01H 9/542 218/4 |
| 2018/0287371 | A1 | 10/2018 | Nyberg et al. |
| 2018/0337590 | A1* | 11/2018 | He ........................... H02M 1/32 |
| 2019/0348924 | A1* | 11/2019 | Kumar ................... H02H 9/002 |
| 2020/0099312 | A1* | 3/2020 | Trainer ............... H02M 7/2173 |
| 2020/0295663 | A1* | 9/2020 | Yelaverthi ............... H02M 1/15 |

FOREIGN PATENT DOCUMENTS

| | | |
|---|---|---|
| CN | 204948019 U | 1/2016 |
| CN | 106291162 A | 1/2017 |
| CN | 106452285 A | 2/2017 |
| CN | 206164114 U | 5/2017 |
| CN | 207691701 U | 8/2018 |
| CN | 107276020 B | 11/2019 |
| CN | 111193415 A | 5/2020 |
| EP | 3229252 B1 | 4/2019 |
| JP | H04334976 A | 11/1992 |
| JP | 2008067566 A | 3/2008 |
| JP | 2011083115 A | 4/2011 |
| JP | 2013085325 A | 5/2013 |
| JP | 2018019560 A | 2/2018 |
| JP | 6360138 B2 | 7/2018 |
| JP | 2018152925 A | 9/2018 |
| KR | 20170114440 A | 10/2017 |
| WO | 2018033964 A1 | 2/2018 |

OTHER PUBLICATIONS

Coursol et al., "Modeling MOV-protected series capacitors for short-circuit studies," IEEE Transactions on Power Delivery, vol. 8, No. 1, pp. 448-453, Institute of Electrical and Electronics Engineers, New York, New York (Jan. 1993).

* cited by examiner

FAULT PROTECTION APPARATUS AND PHOTOVOLTAIC POWER GENERATION SYSTEM

CROSS-REFERENCE TO RELATED APPLICATIONS

This application is a continuation of International Application No. PCT/CN2021/141683, filed on Dec. 27, 2021, which claims priority to Chinese Patent Application No. 202110069765.0, filed on Jan. 19, 2021. The disclosures of the aforementioned applications are hereby incorporated by reference in their entireties.

TECHNICAL FIELD

This application relates to the field of electric and electronic technologies, and in particular, to a fault protection apparatus and a photovoltaic power generation system.

BACKGROUND

Fields such as solar power generation, wind power generation, frequency conversion, an uninterruptible power supply (UPS) systems, motor drivers, and new energy vehicles all need an electric energy transducer, also referred to as an inverter, configured to implement conversion from a direct current to an alternating current. A multi-level circuit that can output three or more voltage levels is widely applied and attracts wide attention. In comparison with a two-level circuit, the multi-level circuit that can output three or more voltage levels has advantages, for example, many output levels, a small voltage stress, a small ripple current, and a good harmonic feature. In this way, an output voltage pulse approaches an industrial frequency alternating current voltage, to reduce a volume and a weight of a filter. The multi-level circuit generally uses a semiconductor switch component to implement conversion from a direct current to an alternating current. A typical three-phase bridge inverter circuit is used as an example. A semiconductor switch transistor of each bridge arm is turned on for a half of a period in a sine period, and bridge arms of the three-phase bridge inverter circuit are alternately turned on and have a conductive angle difference of 120 degrees. An output voltage waveform obtained in this way is approximately a sine wave.

In the conventional technologies, a three-level circuit including two direct current voltage sources is widely applied. However, an intermediate node between the two direct current voltage sources in the three-level circuit is directly electrically connected to an intermediate node of a semiconductor switch component. Therefore, when an inverter bridge arm of the semiconductor switch component is faulty, an overvoltage damage is easily caused to the half-bus capacitor. Further, a circuit and a device may be further damaged after the damage is further spread. Consequently, reliability of the circuit is greatly reduced.

Therefore, a technical solution needs to be provided for the multi-level circuit, to protect a capacitor bridge arm when a short-circuit fault occurs on the inverter bridge arm, thereby avoiding a circuit failure damage.

SUMMARY

An objective of this application is to provide a fault protection apparatus and a photovoltaic power generation system, to protect a capacitor bridge arm when a short-circuit fault occurs on an inverter bridge arm, thereby avoiding a circuit failure damage.

According to a first aspect, an embodiment of this application provides a photovoltaic power generation system. The photovoltaic power generation system includes a capacitor bridge arm, an inverter bridge arm, and the fault protection apparatus. The capacitor bridge arm includes a positive electrode output port, a negative electrode output port, and a reference output port between the positive electrode output port and the negative electrode output port. The inverter bridge arm includes a positive electrode input port, a negative electrode input port, and a reference input port between the positive electrode input port and the negative electrode input port. The positive electrode input port is connected to the positive electrode output port. The negative electrode input port is connected to the negative electrode output port. The reference input port is connected to the reference output port by using the fault protection apparatus. The fault protection apparatus is turned off based on a magnitude value or a variation of a voltage, or a magnitude value or a variation of a current between the reference input port and the positive electrode input port or the negative electrode input port.

In the technical solutions described in the first aspect, a connection relationship between the reference output port and the reference input port may be adjusted through turning on and turning off the fault protection apparatus, to avoid an overvoltage damage to a half-bus capacitor and improve reliability of a circuit.

With reference to the first aspect, in an embodiment, that the fault protection apparatus is turned off based on the magnitude value or the variation of the voltage between the reference input port and the positive electrode input port or the negative electrode input port includes that when the voltage between the negative electrode input port and the reference input port is less than a first threshold, the fault protection apparatus is turned off; or when the voltage between the positive electrode input port and the reference input port is less than a second threshold, the fault protection apparatus is turned off; or when a decrease rate of the voltage between the negative electrode input port and the reference input port is greater than a third threshold, the fault protection apparatus is turned off; or when a decrease rate of the voltage between the positive electrode input port and the reference input port is greater than a fourth threshold, the fault protection apparatus is turned off.

In this way, a connection relationship between the reference output port and the reference input port is adjusted through monitoring the variation of the voltage and controlling the fault protection apparatus to be turned off, to avoid an overvoltage damage to a half-bus capacitor and improve reliability of a circuit.

With reference to the first aspect, in an embodiment, the fault protection apparatus is further turned off based on a current flowing through the fault protection apparatus.

In this way, a connection relationship between the reference output port and the reference input port is adjusted through monitoring the current flowing through the fault protection apparatus and controlling the fault protection apparatus to be turned off, to avoid an overvoltage damage to a half-bus capacitor and improve reliability of a circuit.

With reference to the first aspect, in an embodiment, the inverter bridge arm further includes at least one semiconductor switch component connected between the reference input port and the positive electrode input port or the negative electrode input port, and the fault protection apparatus is further turned off based on a current flowing through the at least one semiconductor switch component or a voltage applied between a first transmission electrode and a second transmission electrode of the at least one semiconductor switch component.

In this way, a connection relationship between the reference output port and the reference input port is adjusted through monitoring a voltage status and a current status of the semiconductor switch component and controlling the fault protection apparatus to be turned off, to avoid an overvoltage damage to a half-bus capacitor and improve reliability of a circuit.

With reference to the first aspect, in an embodiment, the fault protection apparatus includes a primary circuit breaker, the primary circuit breaker includes a first switch transistor and a second switch transistor, the first switch transistor and the second switch transistor are connected in series in reverse directions between the reference output port and the reference input port, and the fault protection apparatus is turned on and turned off through controlling on/off of the first switch transistor and the second switch transistor.

In this way, the fault protection apparatus comprising a circuit break switch is controlled to be turned on and turned off through controlling on/off of the first switch transistor and the second switch transistor.

With reference to the first aspect, in an embodiment, the first switch transistor and the second switch transistor are MOSFETs, IGBTs, GTRs, GTOs, HEMTs, MODFETs, 2-DEGFETs, or SDHTs.

In this way, various types of switch transistors are used.

With reference to the first aspect, in an embodiment, the fault protection apparatus further includes a high impedance component. The high impedance component and the primary circuit breaker are connected in parallel between the reference output port and the reference input port.

In this way, a charging/discharging speed of the capacitor bridge arm is slowed down by using the high impedance component. This helps another protection mechanism to react, to improve stability of a system.

With reference to the first aspect, in an embodiment, the high impedance component is a thermistor.

In this way, a charging/discharging speed of the capacitor bridge arm is slowed down by using the thermistor. This helps another protection mechanism to react, to improve stability of a system.

With reference to the first aspect, in an embodiment, the fault protection apparatus further includes a varistor. The varistor and the primary circuit breaker are connected in parallel between the reference output port and the reference input port.

In this way, the varistor absorbs energy remaining in the fault protection apparatus in a circuit break process, to prevent an overvoltage damage and improve reliability of a circuit.

With reference to the first aspect, in an embodiment, the fault protection apparatus further includes a high-speed mechanical breaker. The high-speed mechanical breaker, the varistor, and the primary circuit breaker are connected in parallel between the reference output port and the reference input port. The high-speed mechanical breaker is turned on after the first switch transistor and the second switch transistor of the primary circuit breaker are turned on. The high-speed mechanical breaker is turned off before the first switch transistor and the second switch transistor of the primary circuit breaker are turned off.

In this way, bypassing processing is performed on the primary circuit breaker through turning on the high-speed mechanical breaker after the switch transistors of the primary circuit breaker are turned on, to reduce a loss through turning on the high-speed mechanical breaker.

With reference to the first aspect, in an embodiment, the fault protection apparatus further includes a high-speed mechanical breaker and an auxiliary circuit breaker. The auxiliary circuit breaker includes a third switch transistor and a fourth switch transistor. The third switch transistor and the fourth switch transistor are connected in series in reverse directions, and then are connected in series to the high-speed mechanical breaker between the reference output port and the reference input port. The high-speed mechanical breaker and the auxiliary circuit breaker are connected in series, and then are connected in parallel to the varistor and the primary circuit breaker between the reference output port and the reference input port. The third switch transistor and the fourth switch transistor of the auxiliary circuit breaker and the high-speed mechanical breaker are turned on after the first switch transistor and the second switch transistor of the primary circuit breaker are turned on. The high-speed mechanical breaker is turned off before the first switch transistor and the second switch transistor of the primary circuit breaker are turned off. The third switch transistor and the fourth switch transistor of the auxiliary circuit breaker are turned off before the high-speed mechanical breaker is turned off.

In this way, bypassing processing is performed on the primary circuit breaker through turning on the high-speed mechanical breaker and the auxiliary circuit breaker to form a bypass branch after the switch transistors of the primary circuit breaker are turned on, to reduce a loss of a circuit break switch SP.

With reference to the first aspect, in an embodiment, the third switch transistor and the fourth switch transistor are MOSFETs, IGBTs, GTRs, GTOs, HEMTs, MODFETs, 2-DEGFETs, or SDHTs.

In this way, various types of switch transistors are used.

With reference to the first aspect, in an embodiment, the inverter bridge arm includes an ANPC three-level bridge arm. The ANPC three-level bridge arm includes a plurality of semiconductor switch components connected in series between the reference input port and the positive electrode input port, and a plurality of semiconductor switch components connected in series between the reference input port and the negative electrode input port. The fault protection apparatus is further turned off based on a current flowing through each of the plurality of semiconductor switch components or a voltage applied between a first transmission electrode and a second transmission electrode of each of the plurality of semiconductor switch components.

In this way, whether a short-circuit fault occurs on the ANPC three-level bridge arm may be determined through monitoring a voltage status and a current status of each of the plurality of semiconductor switch components, and a connection relationship between the reference output port and the reference input port is adjusted in time through controlling the fault protection apparatus to be turned off, to avoid an overvoltage damage to a half-bus capacitor and improve reliability of a circuit.

With reference to the first aspect, in an embodiment, the inverter bridge arm includes an NPC three-level bridge arm. The NPC three-level bridge arm includes a plurality of semiconductor switch components connected in series between the reference input port and the positive electrode input port, and a plurality of semiconductor switch components connected in series between the reference input port and the negative electrode input port. The fault protection apparatus is further turned off based on a current flowing through each of the plurality of semiconductor switch components or a voltage applied between a first transmission electrode and a second transmission electrode of each of the plurality of semiconductor switch components.

In this way, whether a short-circuit fault occurs on the NPC three-level bridge arm may be determined through monitoring a voltage status and a current status of each of the plurality of semiconductor switch components, and a connection relationship between the reference output port and the reference input port is adjusted in time through controlling the fault protection apparatus to be turned off, to avoid an overvoltage damage to a half-bus capacitor and improve reliability of a circuit.

With reference to the first aspect, in an embodiment, the inverter bridge arm includes a T-type three-level bridge arm. The T-type three-level bridge arm includes a plurality of semiconductor switch components connected in series between the positive electrode input port and the negative electrode input port. The fault protection apparatus is further turned off based on a current flowing through each of the plurality of semiconductor switch components or a voltage applied between a first transmission electrode and a second transmission electrode of each of the plurality of semiconductor switch components.

In this way, whether a short-circuit fault occurs on the T-type three-level bridge arm may be determined through monitoring a voltage status and a current status of each of the plurality of semiconductor switch components, and a connection relationship between the reference output port and the reference input port is adjusted in time through controlling the fault protection apparatus to be turned off, to avoid an overvoltage damage to a half-bus capacitor and improve reliability of a circuit.

With reference to the first aspect, in an embodiment, the inverter bridge arm includes a five-level bridge arm. The five-level bridge arm includes a plurality of semiconductor switch components connected in series between the reference input port and the positive electrode input port, and a plurality of semiconductor switch components connected in series between the reference input port and the negative electrode input port. The fault protection apparatus is further turned off based on a current flowing through each of the plurality of semiconductor switch components or a voltage applied between a first transmission electrode and a second transmission electrode of each of the plurality of semiconductor switch components.

In this way, whether a short-circuit fault occurs on the five-level bridge arm may be determined through monitoring a voltage status and a current status of each of the plurality of semiconductor switch components, and a connection relationship between the reference output port and the reference input port is adjusted in time through controlling the fault protection apparatus to be turned off, to avoid an overvoltage damage to a half-bus capacitor and improve reliability of a circuit.

According to a second aspect, an embodiment of this application provides a method for controlling a fault protection apparatus. The method is applied to a photovoltaic power generation system. The photovoltaic power generation system includes a capacitor bridge arm, an inverter bridge arm, and the fault protection apparatus. The capacitor bridge arm includes a positive electrode output port, a negative electrode output port, and a reference output port between the positive electrode output port and the negative electrode output port. The inverter bridge arm includes a positive electrode input port, a negative electrode input port, and a reference input port between the positive electrode input port and the negative electrode input port. The positive electrode input port is connected to the positive electrode output port. The negative electrode input port is connected to the negative electrode output port. The reference input port is connected to the reference output port by using the fault protection apparatus. The method includes: controlling the fault protection apparatus to be turned off based on a magnitude value or a variation of a voltage, or a magnitude value or a variation of a current between the reference input port and the positive electrode input port or the negative electrode input port.

In the technical solutions described in the second aspect, a connection relationship between the reference output port and the reference input port may be adjusted through turning on and turning off the fault protection apparatus, to avoid an overvoltage damage of a half-bus capacitor and improve reliability of a circuit.

BRIEF DESCRIPTION OF DRAWINGS

To describe the technical solutions in embodiments of this application or in the background more clearly, the following describes the accompanying drawings required for describing the embodiments of this application or the background.

DESCRIPTION OF EMBODIMENTS

An embodiment of this application provides a photovoltaic power generation system. The photovoltaic power generation system includes a capacitor bridge arm, an inverter bridge arm, and a fault protection apparatus. The capacitor bridge arm includes a positive electrode output port, a negative electrode output port, and a reference output port between the positive electrode output port and the negative electrode output port. The inverter bridge arm includes a positive electrode input port, a negative electrode input port, and a reference input port between the positive electrode input port and the negative electrode input port. The positive electrode input port is connected to the positive electrode output port. The negative electrode input port is connected to the negative electrode output port. The reference input port is connected to the reference output port by using the fault protection apparatus. The fault protection apparatus is turned off based on a magnitude value or a variation of a voltage, or a magnitude value or a variation of a current between the reference input port and the positive electrode input port or the negative electrode input port. In this way, a connection relationship between the reference output port and the reference input port may be adjusted through turning on and turning off the fault protection apparatus, to avoid an overvoltage damage of a half-bus capacitor and improve reliability of a circuit.

This embodiment of this application may be applied to the following application scenarios: solar power generation, wind power generation, a frequency converter, a UPS, a motor driver, a new energy vehicle, or another application scenario in which a multi-level inverter circuit is required.

This embodiment of this application may be adjusted and improved based on a specific application environment. This is not specifically limited herein.

To make a person skilled in the art understand the solutions in this application better, the following describes the embodiments of this application with reference to the accompanying drawings in the embodiments of this application.

Figure 1:
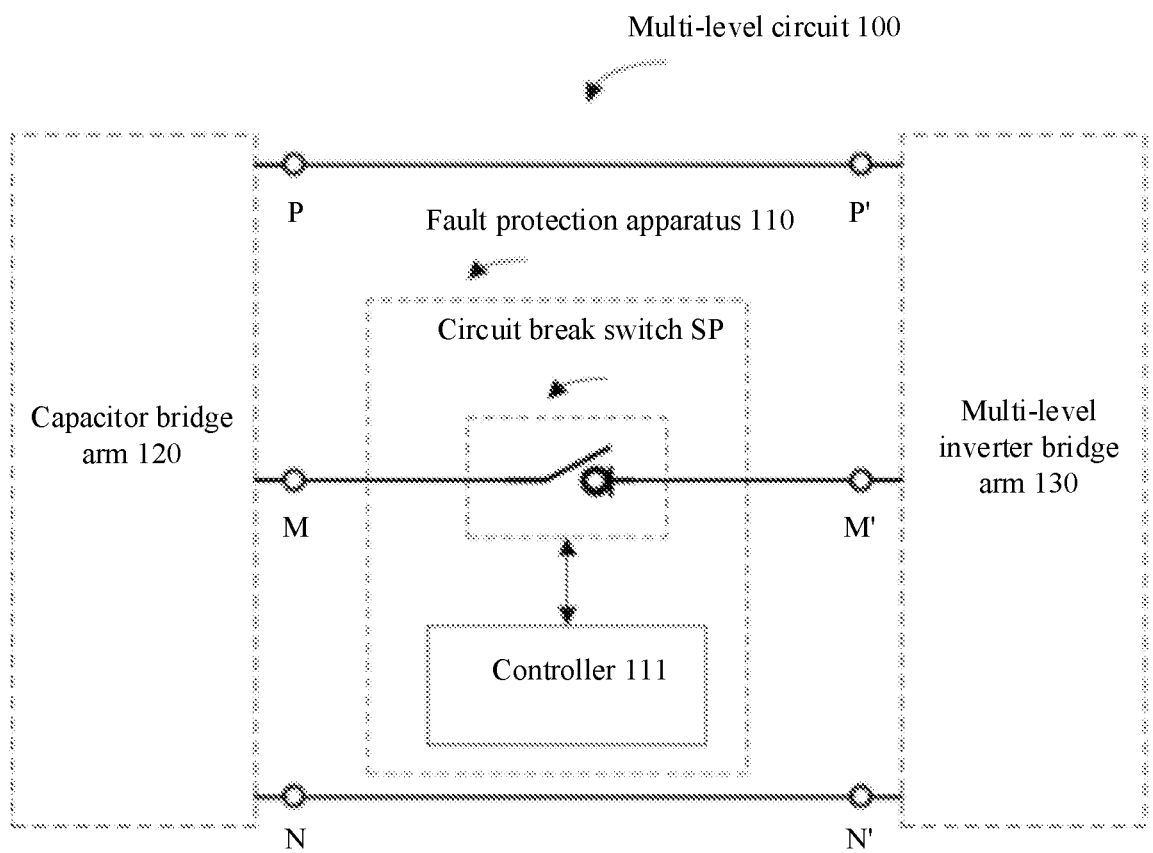
FIG. 1 is a block diagram of principles of a multi-level circuit including a fault protection apparatus according to an embodiment of this application.

FIG. 1 is a block diagram of principles of a multi-level circuit including a fault protection apparatus according to an embodiment of this application. As shown in FIG. 1, the multi-level circuit 100 includes a fault protection apparatus 110, a capacitor bridge arm 120, and a multi-level inverter bridge arm 130. The capacitor bridge arm 120 has three output ports: respectively, a positive electrode output port P, a negative electrode output port N, and a reference output port M. Correspondingly, the multi-level inverter bridge arm 130 has three input ports: respectively, a positive electrode input port P', a negative electrode input port N', and a reference input port M'. The positive electrode output port P is connected to the positive electrode input port P'. The negative electrode output port N is connected to the negative electrode input port N'. One end of the fault protection apparatus 110 is connected to the reference output port M, and the other end is connected to the reference input port M'. In this way, a one-to-one connection relationship exists between each output port of the capacitor bridge arm 120 and each input port of the multi-level inverter bridge arm 130, and the reference output port M is indirectly connected to the reference input port M' by using the fault protection apparatus 110. It should be understood that a positive electrode and a negative electrode mentioned in this embodiment of this application are merely relative concepts. For ease of description, one port is designated as a positive electrode, and the other port is designated as a negative electrode. This should not be construed as a limitation.

Still with reference to FIG. 1, the fault protection apparatus 110 includes a circuit break switch SP and a controller 111. One end of the circuit break switch SP is connected to the reference output port M, and the other end is connected to the reference input port M'. The controller 111 is communicatively connected to the circuit break switch SP, and is configured to control on/off of the circuit break switch SP. When the controller 111 controls the circuit break switch SP to be turned on, the reference output port M is connected to the reference input port M' by using the circuit break switch SP. When the controller 111 controls the circuit break switch SP to be turned off, the reference output port M cannot be connected to the reference input port M' due to blocking of the circuit break switch SP. In this way, the connection relationship between the reference output port M and the reference input port M' may be adjusted by using the controller 111 to control on/off of the circuit break switch SP. A key point of the application is that a circuit breaker protection apparatus, including a circuit break circuit SP or a mechanical bleaker/switch, is connected between a reference port M' of the capacitor bridge arm and a reference port M of the multi-level inverter bridge arm. A specific structure of the protection apparatus is not critical and should not be the restriction of the present invention. For example, the circuit break switch SP can apply anyone of various common circuit breaker protection implementations and can be with one of traditional structures available in the market. Further details are not described herein again.

Figure 2:
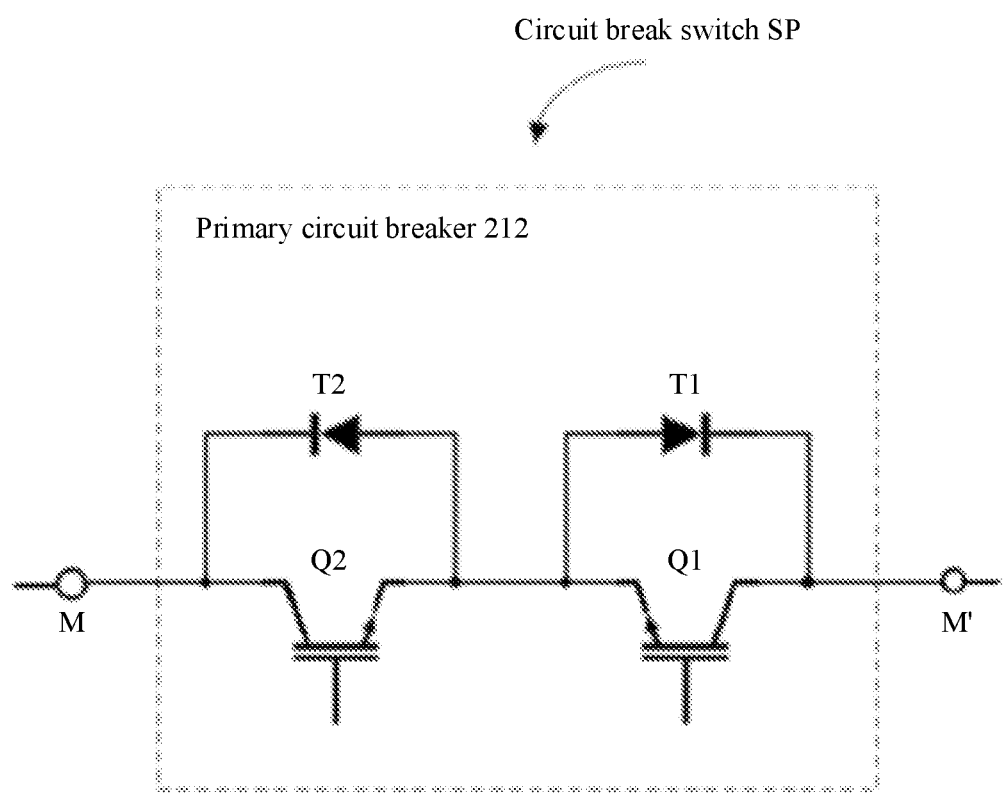
FIG. 2 is a block diagram of a structure of a first implementation of a circuit break switch SP in the fault protection apparatus shown in FIG. 1 according to an embodiment of this application.

FIG. 2 is a block diagram of a structure of a first implementation of a circuit break switch SP in the fault protection apparatus shown in FIG. 1 according to an embodiment of this application. As shown in FIG. 2, the circuit break switch SP includes a primary circuit breaker 212. The primary circuit breaker 212 includes two semiconductor switch components. Insulated gate bipolar transistors (IGBTs) are used as an example, respectively Q1 and Q2. Herein, Q1 and Q2 are connected in series in reverse directions between the reference output port M and the reference input port M'. In other words, an emitter of Q1 is connected to an emitter of Q2, a collector of Q1 is connected to the reference input port M', and a collector of Q2 is connected to the reference output port M. In another implementation, the collector of Q1 is connected to the collector of Q2, the emitter of Q1 is connected to the reference input port M', and the emitter of Q2 is connected to the reference output port M. In these two implementations, locations of Q1 and Q2 may also be interchanged. The primary circuit breaker 212 further includes two diodes: T1 and T2. Herein, T1 and T2 are respectively in an anti-parallel connection relationship with Q1 and Q2. Specifically, the diode: T1 corresponds to Q1, an anode of T1 is connected to the emitter of Q1, and a cathode of T1 is connected to the collector of Q1; and the diode: T2 corresponds to Q2, an anode of T2 is connected to the emitter of Q2, and a cathode of T2 is connected to the collector of Q2. In this way, a control mechanism of the circuit break switch SP is implemented by using two insulated gate bipolar transistors: Q1 and Q2 connected in series in reverse directions and a pair of diodes: T1 and T2 connected in an anti-parallel connection relationship. For example, when the circuit break switch SP receives a control signal indicating to turn on, gate voltages of the IGBTs in the circuit break switch SP can be controlled, to turn on the IGBT and implement a connection between the reference output port M and the reference input port M'. When the circuit break switch SP receives a control signal indicating to turn off, gate voltages of the IGBTs in the circuit break switch SP can be controlled, to turn off the IGBTs and block a connection between the reference output port M and the reference input port M'. By using the control mechanism of the IGBTs, sending the control signal indicating to turn on to the circuit break switch SP may be stopped. Therefore, after the control signal indicating to turn on is not received, the circuit break switch SP may drive the IGBTs to be turned off. In addition, a reverse current/voltage can be suppressed by using the diodes connected to the IGBTs in an anti-parallel connection relationship, to avoid a damage caused due to an excessive reverse current/voltage.

Still with reference to FIG. 2, it should be understood that the IGBTs shown in FIG. 2 is merely an example. In some example embodiments, two semiconductor switch components included in the primary circuit breaker 212 are respectively a first switch transistor and a second switch transistor. The first switch transistor and the second switch transistor are connected in series in reverse directions between the reference output port of the capacitor bridge arm and the reference input port of the multi-level inverter bridge arm. The controller controls the circuit break switch to be turned on and turned off through controlling on/off of the first switch transistor and the second switch transistor of the primary circuit breaker. In some example embodiments, the two semiconductor switch components included in the primary circuit breaker 212 may be implemented by using another semiconductor component having similar functions, for example, a metal-oxide-semiconductor field-effect transistor (MOSFET), a giant transistor (GTR), a gate turn-off thyristor (GTO), or another appropriate component. A pair of diodes is correspondingly configured. In some example embodiments, these semiconductor components may also use a high electron mobility transistor (high electron mobility transistor, HEMT), also referred to as a modulation-doped field effect transistor (MODFET), or a two-dimensional electron gas field effect transistor (2-DEGFET), or a selectively-doped heterojunction transistor (SDHT). These may be adjusted and improved based on a specific application environment. This is not specifically limited herein. In other words, the first switch transistor and the second switch transistor are MOSFETs, IGBTs, GTRs, GTOs, HEMTs, MODFETs, 2-DEGFETs, or SDHTs.

Figure 3:
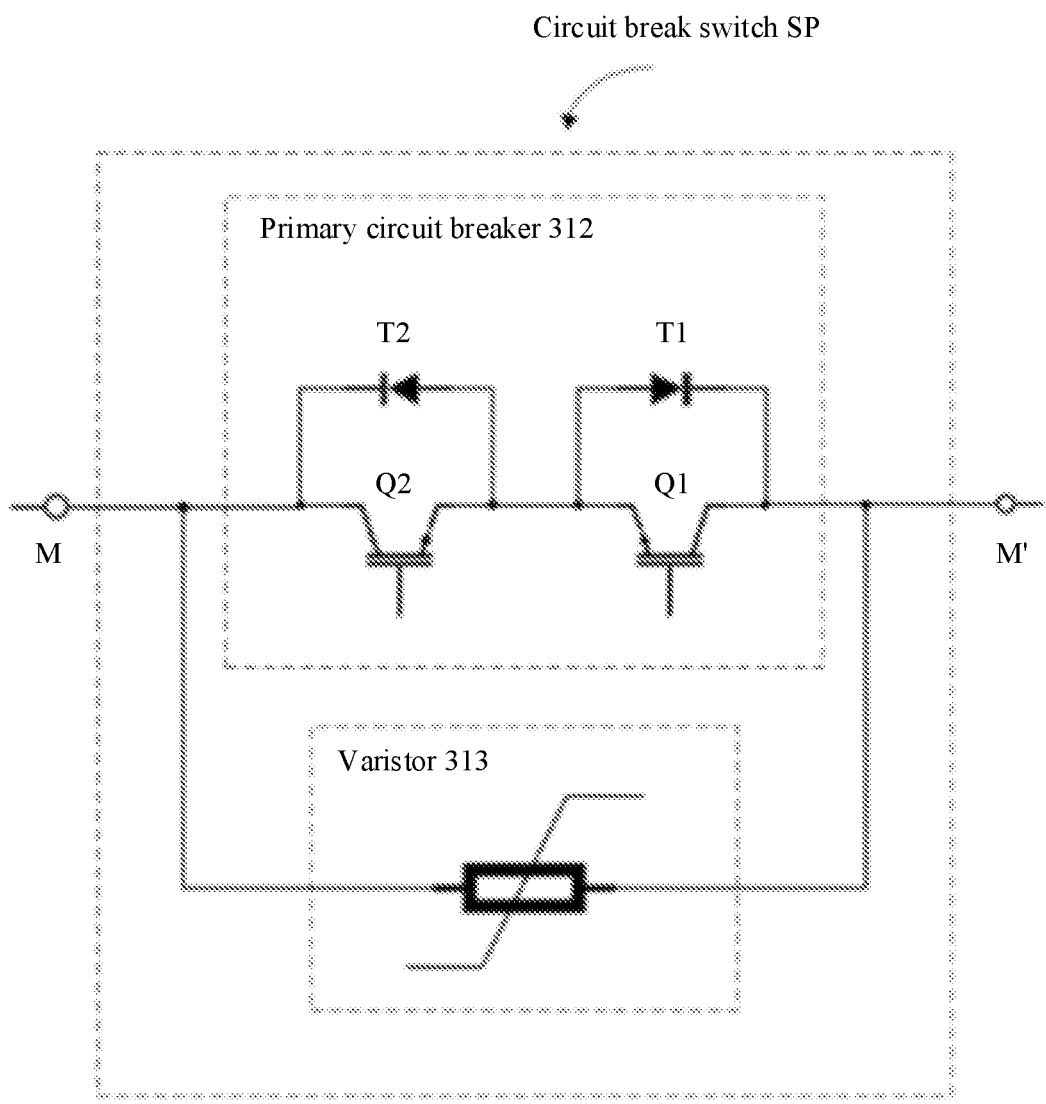
FIG. 3 is a block diagram of a structure of a second implementation of a circuit break switch SP in the fault protection apparatus shown in FIG. 1 according to an embodiment of this application.

FIG. 3 is a block diagram of a structure of a second implementation of a circuit break switch SP in the fault protection apparatus shown in FIG. 1 according to an embodiment of this application. As shown in FIG. 3, the circuit break switch SP includes a primary circuit breaker 312 and a varistor 313. A structure and a function of the primary circuit breaker 312 are similar to those of the primary circuit breaker 212 shown in FIG. 2. Details are not described herein again. The varistor 313 may be based on a metal oxide material. The varistor 313 and the primary circuit breaker 312 are connected in parallel between the reference output port M and the reference input port M'. The varistor 313 has a non-linear volt-ampere feature. The varistor 313 is configured to absorb energy remaining in a circuit break process of the circuit break switch SP, to prevent an overvoltage damage to the primary circuit breaker 312 and improve reliability of a circuit.

Figure 4:
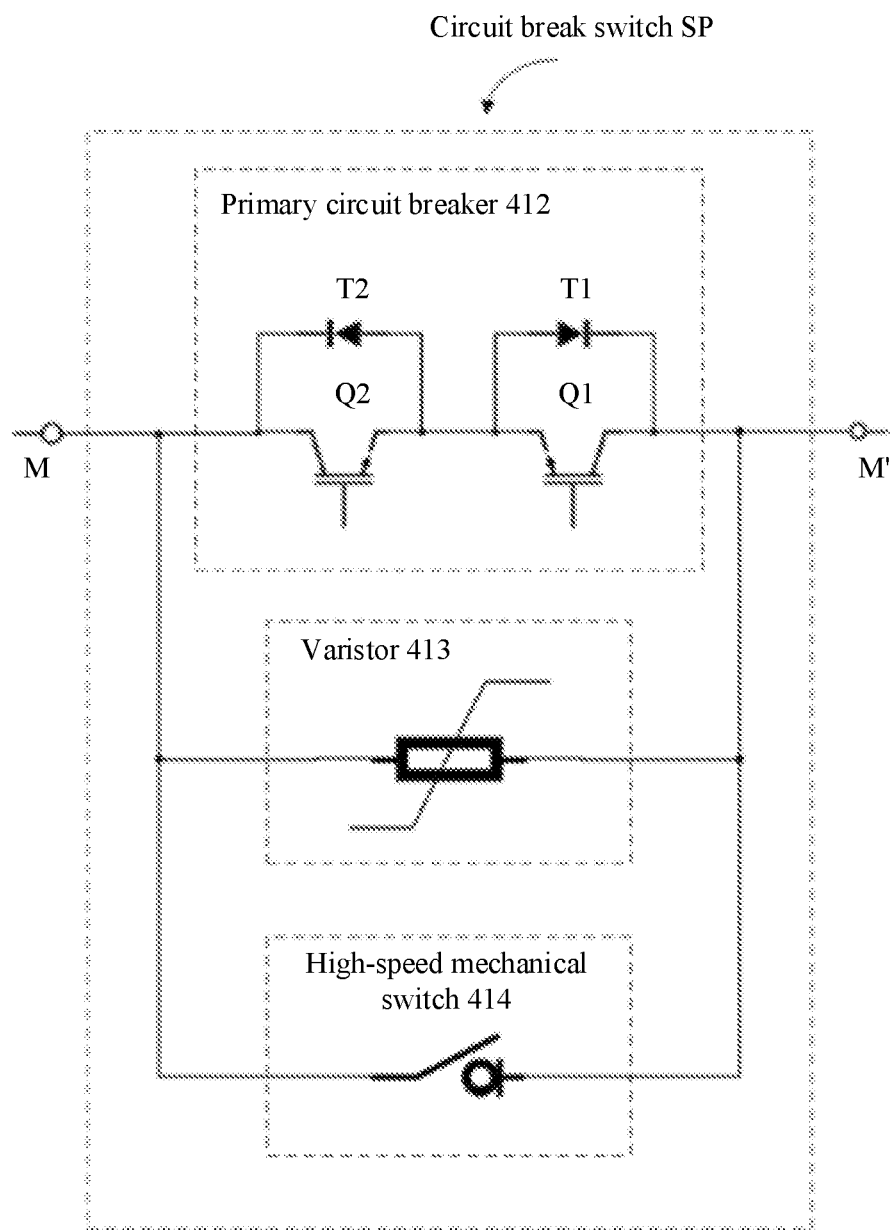
FIG. 4 is a block diagram of a structure of a third implementation of a circuit break switch SP in the fault protection apparatus shown in FIG. 1 according to an embodiment of this application.

FIG. 4 is a block diagram of a structure of a third implementation of a circuit break switch SP in the fault protection apparatus shown in FIG. 1 according to an embodiment of this application. As shown in FIG. 4, the circuit break switch SP includes a primary circuit breaker 412, a varistor 413, and a high-speed mechanical breaker 414. The primary circuit breaker 412, the varistor 413, and the high-speed mechanical breaker 414 are all connected in parallel between the reference output port M and the reference input port M'. A structure and a function of the primary circuit breaker 412 are similar to those of the primary circuit breaker 212 shown in FIG. 2. Details are not described herein again. A structure and a function of the varistor 413 are similar to those of the varistor 313 shown in FIG. 3. Details are not described herein again. The high-speed mechanical breaker 414 is turned on only after IGBTs of the primary circuit breaker 412 are turned on. In other words, after the IGBTs of the primary circuit breaker 412 are turned on, bypassing processing is performed on the primary circuit breaker 412 by using the high-speed mechanical breaker 414 that is turned on, to reduce a loss of the circuit break switch SP by using the high-speed mechanical breaker 414 that is turned on. The high-speed mechanical breaker 414 is turned off before the IGBTs of the primary circuit breaker 412 are turned off, to ensure that the IGBTs of the primary circuit breaker 412 undertake an impact of a current break and avoid an impact caused when the high-speed mechanical breaker 414 undertakes the impact of the current break.

Figure 5:
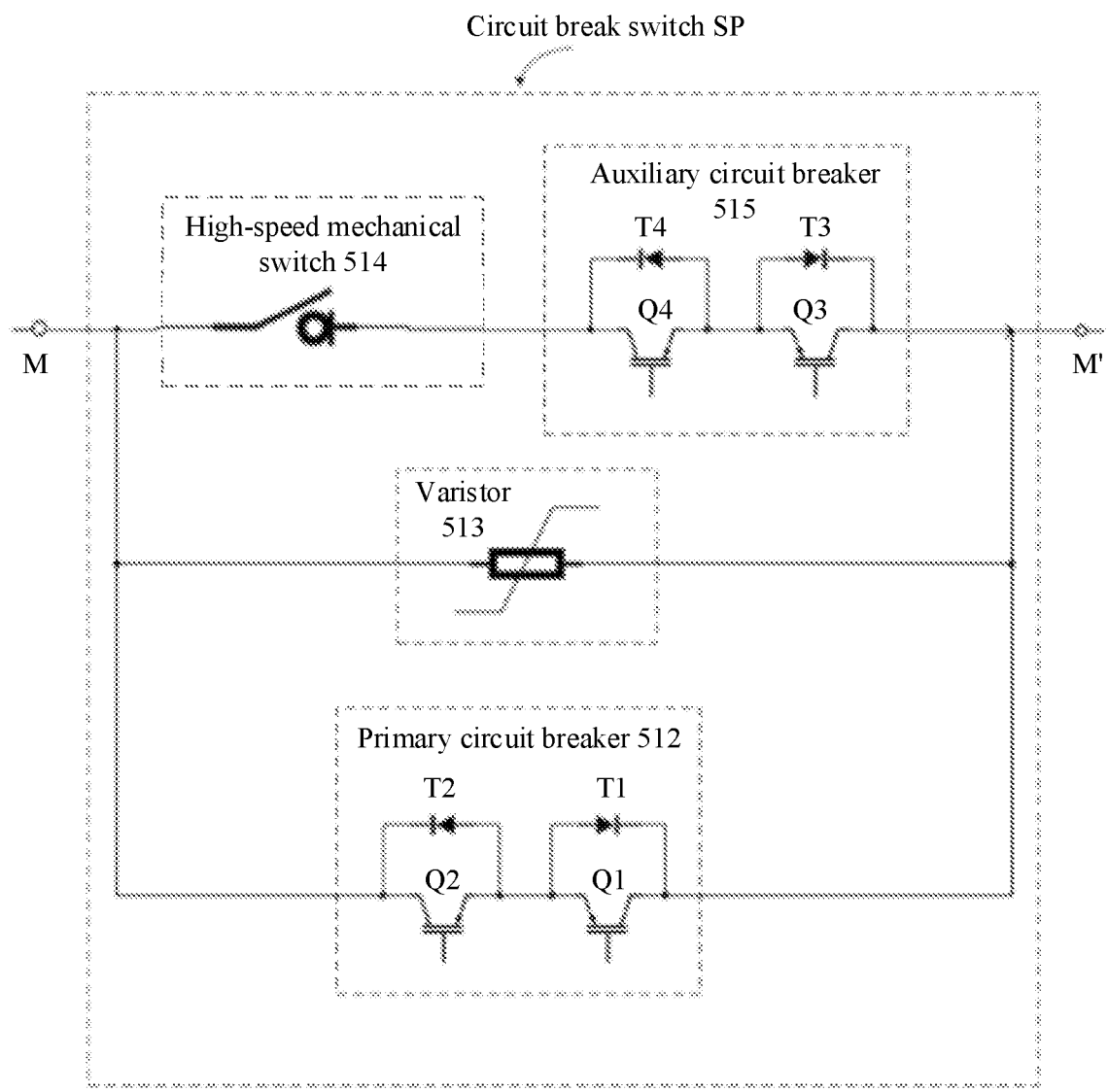
FIG. 5 is a block diagram of a structure of a fourth implementation of a circuit break switch SP in the fault protection apparatus shown in FIG. 1 according to an embodiment of this application.

FIG. 5 is a block diagram of a structure of a fourth implementation of a circuit break switch SP in the fault protection apparatus shown in FIG. 1 according to an embodiment of this application. As shown in FIG. 5, the circuit break switch SP includes a primary circuit breaker 512, a varistor 513, a high-speed mechanical breaker 514, and an auxiliary circuit breaker 515. The high-speed mechanical breaker 514 and the auxiliary circuit breaker 515 are connected in series, and then are connected in parallel to the varistor 513 and the primary circuit breaker 512 between the reference output port M and the reference input port M'. A structure and a function of the primary circuit breaker 512 are similar to those of the primary circuit breaker 212 shown in FIG. 2. Details are not described herein again. A structure and a function of the varistor 513 are similar to those of the varistor 313 shown in FIG. 3. Details are not described herein again. A structure and a function of the high-speed mechanical breaker 514 are similar to those of the high-speed mechanical breaker 414 shown in FIG. 4. Details are not described herein again. The auxiliary circuit breaker 515 includes two semiconductor switch components. IGBTs are used as an example, respectively Q3 and Q4. Herein, Q3 and Q4 are connected in series in reverse directions between the reference input port M' and the high-speed mechanical breaker 514. In other words, an emitter of Q3 is connected to an emitter of Q4, a collector of Q3 is connected to the reference input port M', and a collector of Q4 is connected to the reference high-speed mechanical breaker 514. In another implementation, the collector of Q3 is connected to the collector of Q4, the emitter of Q3 is connected to the reference input port M', and the emitter of Q4 is connected to the high-speed mechanical breaker 514. In these two implementations, locations of Q3 and Q4 may also be interchanged. In addition, locations of the high-speed mechanical breaker 514 and the auxiliary circuit breaker 515 may also be interchanged. The auxiliary circuit breaker 515 further includes two diodes: T3 and T4. Herein, T3 and T4 are respectively in an anti-parallel connection relationship with Q3 and Q4. Specifically, the diode: T3 corresponds to Q3, an anode of T3 is connected to the emitter of Q3, and a cathode of T3 is connected to the collector of Q3; the diode: T4 corresponds to Q4, an anode of T4 is connected to the emitter of Q4, and a cathode of T4 is connected to the collector of Q4. The auxiliary circuit breaker 515 and the high-speed mechanical breaker 514 are turned on only after the IGBTs of the primary circuit breaker 512 are turned on. In other words, bypassing processing is performed on the primary circuit breaker 512 through turning on the high-speed mechanical breaker 514 and the auxiliary circuit breaker 515 to form a bypass branch after the IGBTs of the primary circuit breaker 512 are turned on, to reduce a loss of the circuit break switch SP. The high-speed mechanical breaker 514 is turned off before the IGBTs of the primary circuit breaker 512 are turned off. The auxiliary circuit breaker 515 is turned off before the high-speed mechanical breaker 514 is turned off. In this way, based on the operation of turning off the auxiliary circuit breaker 515, the bypass branch including the high-speed mechanical breaker 514 and the auxiliary circuit breaker 515 is turned off before the IGBTs of the primary circuit breaker 512 are turned off, to ensure that the IGBTs of the primary circuit breaker 512 undertake an impact of a current break and avoid an impact caused when the high-speed mechanical breaker 514 undertakes the impact of the current break.

Still with reference to FIG. 5, it should be understood that the IGBTs shown in FIG. 5 are merely an example. In some example embodiments, two semiconductor switch components included in the auxiliary circuit breaker 515 are respectively a third switch transistor and a fourth switch transistor. The third switch transistor and the fourth switch transistor are MOSFETs, IGBTs, GTRs, GTOs, HEMTs, MODFETs, 2-DEGFETs, or SDHTs.

Figure 6:
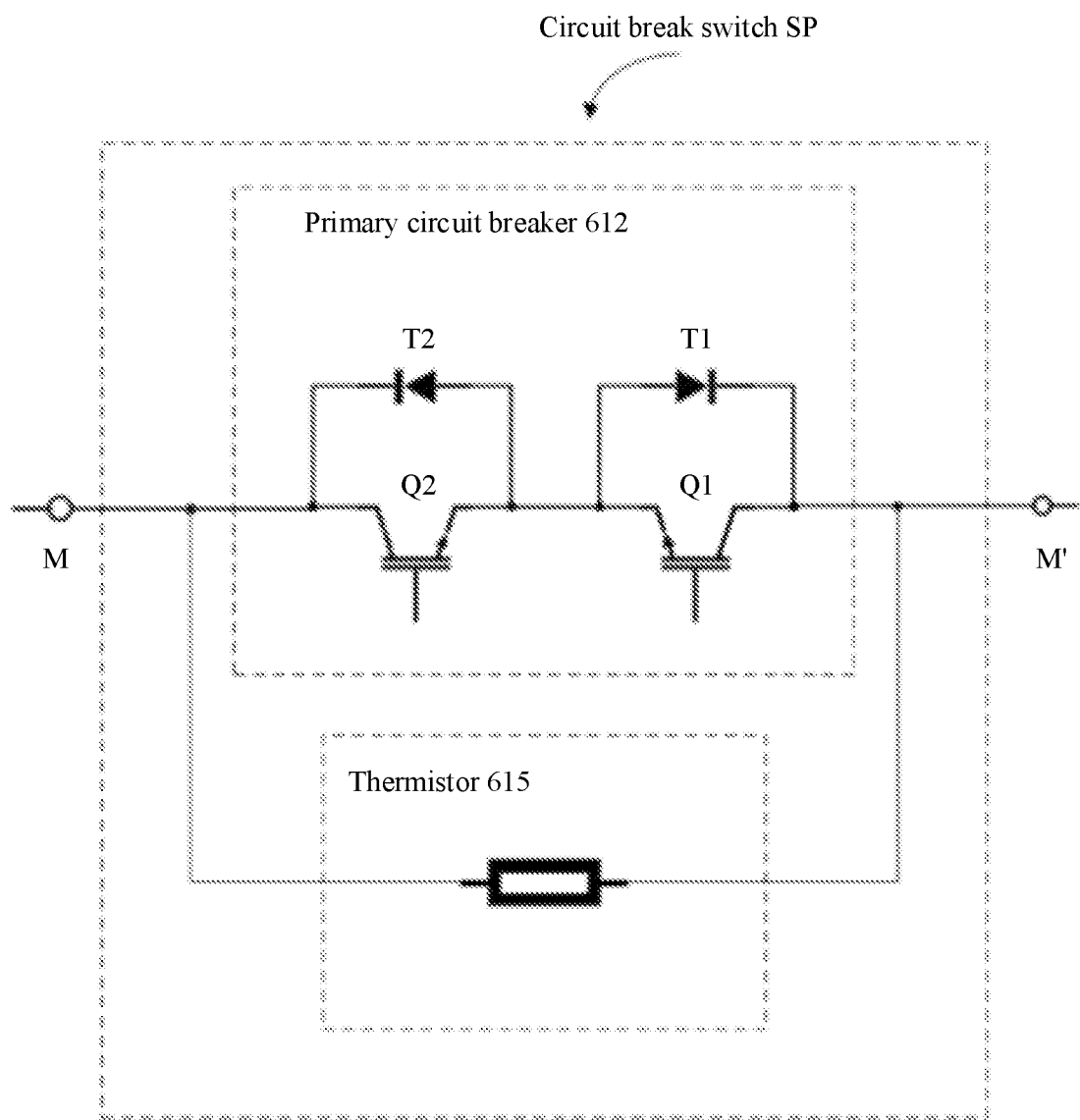
FIG. 6 is a block diagram of a structure of a fifth implementation of a circuit break switch SP in the fault protection apparatus shown in FIG. 1 according to an embodiment of this application.

FIG. 6 is a block diagram of a structure of a fifth implementation of a circuit break switch SP in the fault protection apparatus shown in FIG. 1 according to an embodiment of this application. As shown in FIG. 6, the circuit break switch SP includes a primary circuit breaker 612 and a thermistor 615. The thermistor 615 may alternatively be a high impedance component in another type. A structure and a function of the primary circuit breaker 612 are similar to those of the primary circuit breaker 212 shown in FIG. 2. Details are not described herein again. The primary circuit breaker 612 and the thermistor 615 are connected in parallel between the reference output port M and the reference input port M'. The thermistor 615 undertakes a short-circuit current after the primary circuit breaker 612 is turned off, and charges and discharges a capacitor bridge arm connected to the circuit break switch SP. In this way, a charging/discharging speed of the capacitor bridge arm is slowed down because the thermistor 615 has a relatively large resistance value and the resistance value further increases at a high temperature. This helps another protection mechanism to react, to improve stability of a system. Likewise, the thermistor 615 may be used in parallel with the second, third, and fourth implementations of the circuit breaker switch SP. Details are not described herein.

Figure 7:
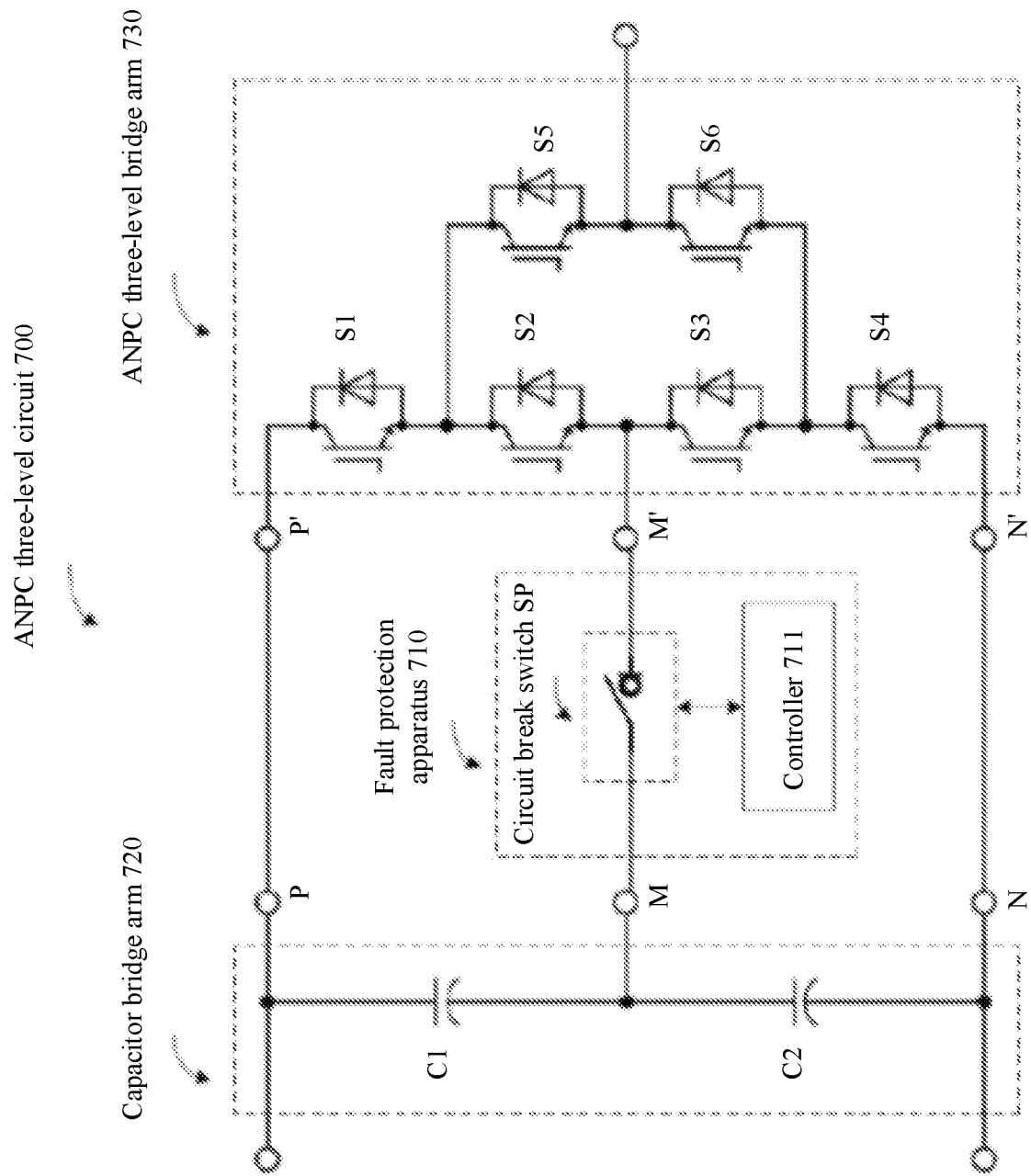
FIG. 7 is a block diagram of principles of an ANPC three-level circuit including a fault protection apparatus according to an embodiment of this application.

FIG. 7 is a block diagram of principles of an ANPC three-level circuit including a fault protection apparatus according to an embodiment of this application. As shown in FIG. 7, the active neutral point clamped (ANPC) three-level circuit 700 includes a fault protection apparatus 710, a capacitor bridge arm 720, and an ANPC three-level bridge arm 730. The fault protection apparatus 710 includes a circuit break switch SP. The circuit break switch SP shown in FIG. 7 may correspond to the circuit break switch SP shown in any one of the embodiments in FIG. 2 to FIG. 5 or any possible combination or variants of these embodiments. The capacitor bridge arm 720 has three output ports: respectively, a positive electrode output port P, a negative electrode output port N, and a reference output port M. Correspondingly, the ANPC three-level bridge arm 730 has three input ports: respectively, a positive electrode input port P', a negative electrode input port N', and a reference input port M'. The ANPC three-level bridge arm 730 further has an external output port O configured to provide an output voltage level for a next-level load or an external network. The positive electrode output port P is connected to the positive electrode input port P'. The negative electrode output port N is connected to the negative electrode input port N'. One end of the fault protection apparatus 710 is connected to the reference output port M, and the other end is connected to the reference input port M'. In this way, a one-to-one connection relationship exists between each output port of the capacitor bridge arm 720 and each input port of the ANPC three-level bridge arm 730, and the reference output port M is indirectly connected to the reference input port M' by using the fault protection apparatus 710. It should be understood that a positive electrode and a negative electrode mentioned in this embodiment of this application are merely relative concepts. For ease of description, one port is designated as a positive electrode, and the other port is designated as a negative electrode. This should not be construed as a limitation.

Still with reference to FIG. 7, the capacitor bridge arm 720 includes two capacitors: C1 and C2. The capacitors: C1 and C2 are connected in series between the positive electrode output port P and the negative electrode output port N. An intermediate node between the capacitors: C1 and C2 is connected to the reference output port M. The ANPC three-level bridge arm 730 includes a total of six semiconductor switch components, respectively labeled as S1, S2, S3, S4, S5, and S6. It should be understood that each of the semiconductor switch components: S1, S2, S3, S4, S5, and S6 included in the ANPC three-level bridge arm 730 is a pair of IGBTs and diodes connected to the IGBTs in an anti-parallel connection relationship. In some example embodiments, these semiconductor switch components may alternatively be implemented by using another semiconductor component having similar functions, for example, a metal-oxide-semiconductor field-effect transistor MOSFET, a giant transistor GTR, a gate turn-off thyristor GTO, or another appropriate component. A pair of diodes is correspondingly configured. In some example embodiments, these semiconductor components may also use a high electron mobility transistor HEMT, also referred to as a modulation-doped field effect transistor MODFET, or a two-dimensional electron gas field effect transistor 2-DEGFET, or a selectively-doped heterojunction transistor SDHT. These may be adjusted and improved based on a specific application environment. This is not specifically limited herein.

Still with reference to FIG. 7, the semiconductor switch components: S1 and S2 are connected in series between the positive electrode input port P' and the reference input port M', and the semiconductor switch components: S3 and S4 are connected in series between the reference input port M' and the negative electrode input port N'. The semiconductor switch components: S2 and S3 are connected. An intermediate node between the semiconductor switch components: S2 and S3 is connected to the reference input port M'. The semiconductor switch components: S5 and S6 are connected in series, and then are respectively connected to an intermediate node between the semiconductor switch components: S1 and S2, and an intermediate node between the semiconductor switch components: S3 and S4. An intermediate node between the semiconductor switch components: S5 and S6 is connected to the external output port O of the ANPC three-level bridge arm 730. When the semiconductor switch components: S1 and S5 are turned on, the external output port O is connected to the positive electrode input port P' by using a branch including the semiconductor switch components: S1 and S5, and the positive electrode output port P is connected to the positive electrode input port P'. Therefore, a voltage output from the external output port O is a first voltage applied to the positive electrode output port P. When the semiconductor switch components: S4 and S6 are turned on, the external output port O is connected to the negative electrode input port N' by using a branch including the semiconductor switch components: S4 and S6, and the negative electrode output port N is connected to the negative electrode input port N'. Therefore, a voltage output from the external output port O is a second voltage applied to the negative electrode output port N. When the semiconductor switch components: S2 and S5 are turned on or when the semiconductor switch components: S3 and S6 are turned on, the external output port O is connected to the reference input port M' by using a branch including the semiconductor switch components: S2 and S5 or a branch including the semiconductor switch components: S3 and S6, and the reference output port M is indirectly connected to the reference input port M' by using the fault protection apparatus 710. Therefore, the voltage output from the external output port O is a third voltage applied to the reference output port M. In this way, through controlling on/off of each semiconductor switch component included in the ANPC three-level bridge arm 730, the voltage output from the external output port O can be switched among the first voltage applied to the positive electrode output port P, the second voltage applied to the negative electrode output port N, and the third voltage applied to the reference output port M, to implement three-level output.

Still with reference to FIG. 7, when a short-circuit fault occurs on the semiconductor switch components: S3 and S4 at the same time, the negative electrode input port N' and the reference input port M' are connected in a short-circuit manner. If a connection relationship is maintained between the reference output port M and the reference input port M', the capacitor C2 is bypassed. In this case, a voltage between the positive electrode output port P and the negative electrode output port N is all applied to the capacitor C1. When a symmetrical design is applied to the capacitor bridge arm 720, the capacitors: C1 and C2 each undertake a half of the voltage between the positive electrode output port P and the negative electrode output port N. Therefore, when the voltage between the positive electrode output port P and the negative electrode output port N is all applied to the capacitor C1, the capacitor C1 may undertake twice a voltage in a normal design, thereby causing an overvoltage damage. Further, a circuit and a device may be further damaged after the damage is further spread. Consequently, reliability of the circuit is greatly reduced. Similarly, when a short-circuit fault occurs on the semiconductor switch components: S1 and S2 at the same time, the positive electrode input port P' and the reference input port M' are connected in a short-circuit manner. If a connection relationship is maintained between the reference output port M and the reference input port M', the capacitor C1 is bypassed. In this case, a voltage between the positive electrode output port P and the negative electrode output port N is all applied to the capacitor C2, thereby causing an overvoltage damage. In this way, the connection relationship between the reference output port M and the reference input port M' needs to be adjusted through controlling on/off of the circuit break switch SP. Specifically, whether a short-circuit fault occurs on the semiconductor switch component may be determined through monitoring one of the following cases: A voltage between the negative electrode input port N' and the reference input port M' is monitored. When the voltage is less than a specific threshold, it is determined that the short-circuit fault occurs on the semiconductor switch components: S3 and S4 at the same time. Alternatively, a voltage between the positive electrode input port P' and the reference input port M' is monitored. When the voltage is less than a specific threshold, it is determined that the short-circuit fault occurs on the semiconductor switch components: S1 and S2 at the same time. Alternatively, a decrease rate of a voltage between the negative electrode input port N' and the reference input port M' is monitored. When the voltage decrease rate is greater than a specific threshold, it is determined that a short-circuit fault occurs on the semiconductor switch components: S3 and S4 at the same time. Alternatively, a decrease rate of a voltage between the positive electrode input port P' and the reference input port M' is monitored. When the voltage decrease rate is greater than a specific threshold, it is determined that a short-circuit fault occurs on the semiconductor switch components: S1 and S2 at the same time. Alternatively, a current flowing from the positive electrode input port P' to the negative electrode input port N' and passing through the semiconductor switch component: S1, S2, S3, or S4 is monitored. When the current is greater than a specific threshold, it is determined that the short-circuit fault occurs on the corresponding semiconductor switch component: S1, S2, S3, or S4. Alternatively, a voltage between a collector and an emitter is monitored when the semiconductor switch component: S1, S2, S3, or S4 is turned on. When the voltage is greater than a specific threshold, it is determined that a short-circuit fault occurs on the corresponding semiconductor switch component: S1, S2, S3, or S4. In this way, whether a short-circuit fault occurs on the ANPC three-level bridge arm 730 may be determined through monitoring the foregoing cases, for example, monitoring a voltage and a current of a specific semiconductor switch component, and a connection relationship between the reference output port M and the reference input port M' is adjusted in time through controlling on/off of the circuit break switch SP, to avoid an overvoltage damage to a half-bus capacitor and improve reliability of a circuit. In addition, a current flowing through the circuit break switch SP may also be monitored. When the current is greater than a specific threshold, it is determined that the short-circuit fault occurs on the ANPC three-level bridge arm 730.

Still with reference to FIG. 7, the ANPC three-level circuit 700 may include a plurality of ANPC three-level bridge arms 730. Each ANPC three-level bridge arm 730 has the structure shown in FIG. 7. Each ANPC three-level bridge arm 730 has three input ports. Input ports of each of the plurality of ANPC three-level bridge arms 730 are connected in parallel to a corresponding positive electrode input port P', a corresponding negative electrode input port N', and a corresponding reference input port M' shown in FIG. 7. Therefore, a parallel connection relationship exists among the plurality of ANPC three-level bridge arms 730. When the plurality of ANPC three-level bridge arms 730 all work normally, the circuit break switch SP of the fault protection apparatus 710 is turned on. When the short-circuit fault occurs on any one of the plurality of ANPC three-level bridge arms 730, the circuit break switch SP of the fault protection apparatus 710 is turned off, to avoid an overvoltage damage to a half-bus capacitor and improve reliability of the circuit. Whether the short-circuit fault occurs on any one of the plurality of ANPC three-level bridge arms 730 may be determined through monitoring whether one of the foregoing cases occurs on each of the ANPC three-level bridge arms 730.

It should be understood that a controller 711 included in the fault protection apparatus 710 is communicatively connected to the circuit break switch SP, and is configured to control on/off of the circuit break switch SP. The controller 711 may include a corresponding circuit and component to monitor the foregoing cases of the short-circuit fault, or may receive an instruction from the outside by using an interface circuit. In some example embodiments, the controller 711 may be provided separately from the fault protection apparatus 710, that is, provided as a separate component. In addition to the foregoing cases, another technical means may be further used to determine whether the short-circuit fault occurs on the semiconductor switch component. These may be adjusted and improved based on a specific application environment. This is not specifically limited herein.

It should be understood that the IGBTs is used as an example for the plurality of semiconductor switch components included in the ANPC three-level bridge arm 730 shown in FIG. 7. FIG. 7 shows examples of a collector and an emitter of each of these semiconductor switch components. When these semiconductor switch components use a semiconductor switch component in another type, for example, a MOSFET, the collector and the emitter are correspondingly replaced with a drain and a source. Therefore, the collector and the emitter shown in FIG. 7 should be understood as example representations of a first transmission electrode and a second transmission electrode of each of the plurality of semiconductor switch components.

Figure 8:
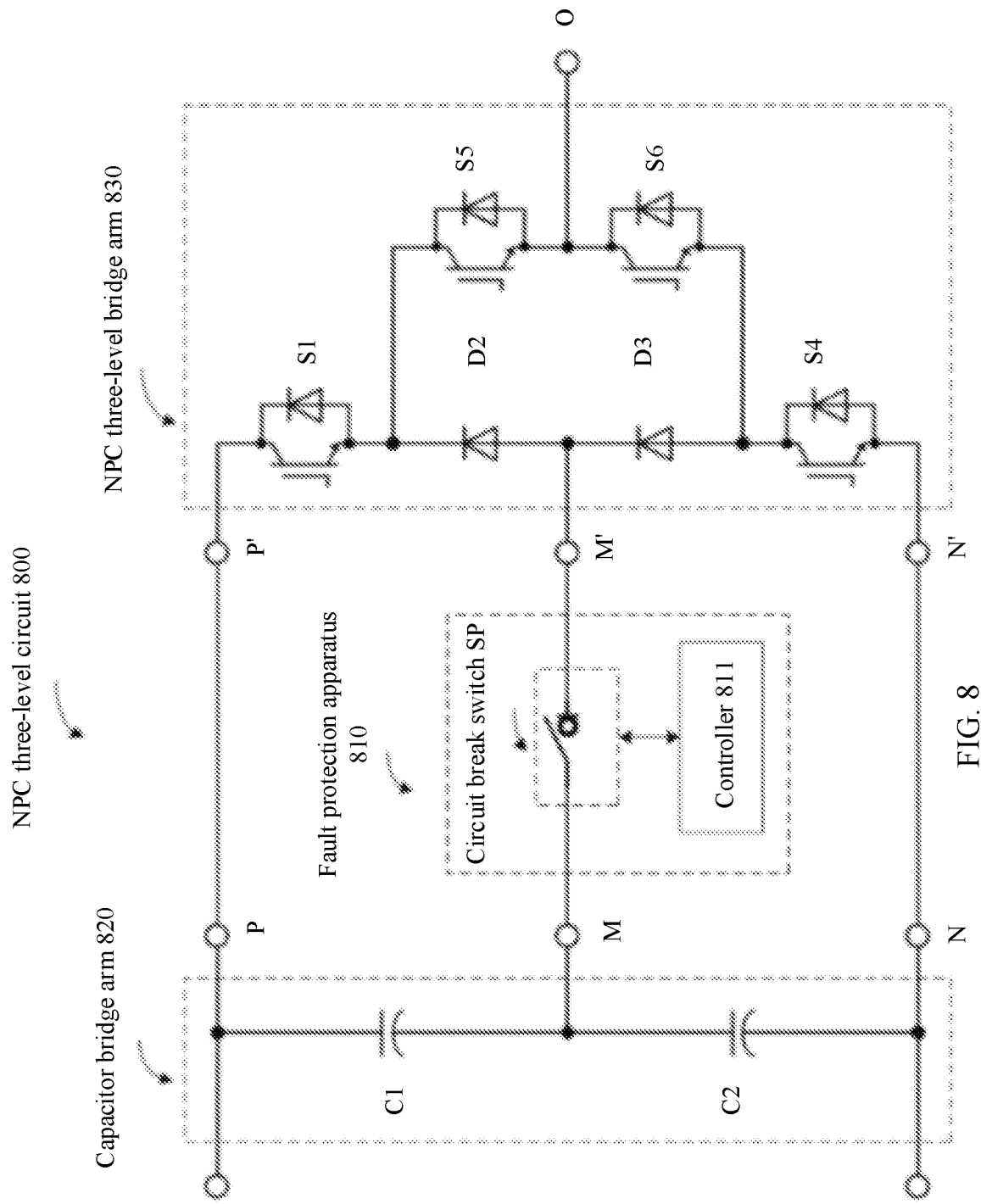
FIG. 8 is a block diagram of principles of an NPC three-level circuit including a fault protection apparatus according to an embodiment of this application.

FIG. 8 is a block diagram of principles of an NPC three-level circuit including a fault protection apparatus according to an embodiment of this application. As shown in FIG. 8, the neutral point clamped (NPC) three-level circuit 800 includes a fault protection apparatus 810, a capacitor bridge arm 820, and an NPC three-level bridge arm 830. The fault protection apparatus 810 includes a circuit break switch SP. The circuit break switch SP shown in FIG. 8 may correspond to the circuit break switch SP shown in any one of the embodiments in FIG. 2 to FIG. 5 or any possible combination or variants of these embodiments. The capacitor bridge arm 820 has three output ports: respectively, a positive electrode output port P, a negative electrode output port N, and a reference output port M. Correspondingly, the NPC three-level bridge arm 830 has three input ports: respectively, a positive electrode input port P', a negative electrode input port N', and a reference input port M'. The NPC three-level bridge arm 830 further has an external output port O configured to provide an output voltage level for a next-level load or an external network. The positive electrode output port P is connected to the positive electrode input port P'. The negative electrode output port N is connected to the negative electrode input port N'. One end of the fault protection apparatus 810 is connected to the reference output port M, and the other end is connected to the reference input port M'. In this way, a one-to-one connection relationship exists between each output port of the capacitor bridge arm 820 and each input port of the NPC three-level bridge arm 830, and the reference output port M is indirectly connected to the reference input port M' by using the fault protection apparatus 810. It should be understood that a positive electrode and a negative electrode mentioned in this embodiment of this application are merely relative concepts. For ease of description, one port is designated as a positive electrode, and the other port is designated as a negative electrode. This should not be construed as a limitation.

Still with reference to FIG. 8, the capacitor bridge arm 820 includes two capacitors: C1 and C2. The capacitors: C1 and C2 are connected in series between the positive electrode output port P and the negative electrode output port N. An intermediate node between the capacitors: C1 and C2 is connected to the reference output port M. The NPC three-level bridge arm 830 includes a total of six semiconductor components, respectively labeled as S1, D2, D3, S4, S5, and S6. The semiconductor components: S1, S4, S5, and S6 are semiconductor switch components, and the semiconductor components: D2 and D3 are diodes. It should be understood that each of the semiconductor switch components: S1, S4, S5, and S6 included in the NPC three-level bridge arm 830 is a pair of IGBTs and diodes connected to the IGBTs in an anti-parallel connection relationship. In some example embodiments, these semiconductor switch components may alternatively be implemented by using another semiconductor component having similar functions, for example, a MOSFET, a GTR, a GTO, or another appropriate component. A pair of diodes is correspondingly configured. In some example embodiments, these semiconductor components may further use a HEMT, also referred to as a MODFET, or a 2-DEGFET, or an SDHT. These may be adjusted and improved based on a specific application environment. This is not specifically limited herein.

Still with reference to FIG. 8, the semiconductor switch component: S1 and D2 are connected in series between the positive electrode input port P' and the reference input port M', and the semiconductor switch component: S4 and D3 are connected in series between the reference input port M' and the negative electrode input port N'. The semiconductor components: D2 and D3 are connected. An intermediate node between the semiconductor switch components: D2 and D3 is connected to the reference input port M'. The semiconductor switch components: S5 and S6 are connected in series, and then are respectively connected to an intermediate node between the semiconductor switch component: S1 and D2, and an intermediate node between the semiconductor switch component: S4 and D3. An intermediate node between the semiconductor switch components: S5 and S6 is connected to the external output port O of the NPC three-level bridge arm 830. An anode of the diode: D2 is connected to the reference input port M', and a cathode is connected to an emitter of the semiconductor switch component: S1. A cathode of the diode: D3 is connected to the reference input port M', and an anode is connected to an emitter of the semiconductor switch component: S4. The anode of the diode: D2 is connected to the cathode of the diode: D3. When the semiconductor switch components: S1 and S5 are turned on, the external output port O is connected to the positive electrode input port P' by using a branch including the semiconductor switch components: S1 and S5, and the positive electrode output port P is connected to the positive electrode input port P'. Therefore, a voltage output from the external output port O is a first voltage applied to the positive electrode output port P. When the semiconductor switch components: S4 and S6 are turned on, the external output port O is connected to the negative electrode input port N' by using a branch including the semiconductor switch components: S4 and S6, and the negative electrode output port N is connected to the negative electrode input port N'. Therefore, a voltage output from the external output port O is a second voltage applied to the negative electrode output port N. When the semiconductor switch component: S5 and D2 are turned on or when the semiconductor switch component: S6 and D3 are turned on, the external output port O is connected to the reference input port M' by using a branch including the semiconductor switch component: S5 and D2 or a branch including the semiconductor switch component: S6 and D3, and the reference output port M is indirectly connected to the reference input port M' by using the fault protection apparatus 810. Therefore, the voltage output from the external output port O is a third voltage applied to the reference output port M. In this way, through controlling on/off of each semiconductor switch component included in the NPC three-level bridge arm 830, the voltage output from the external output port O can be switched among the first voltage applied to the positive electrode output port P, the second voltage applied to the negative electrode output port N, and the third voltage applied to the reference output port M, to implement three-level output.

Still with reference to FIG. 8, when a short-circuit fault occurs on the semiconductor switch component: S4 and D3 at the same time, the negative electrode input port N' and the reference input port M' are connected in a short-circuit manner. If a connection relationship is maintained between the reference output port M and the reference input port M', the capacitor C2 is bypassed. In this case, a voltage between the positive electrode output port P and the negative electrode output port N is all applied to the capacitor C1. When a symmetrical design is applied to the capacitor bridge arm 820, the capacitors: C1 and C2 each undertake a half of the voltage between the positive electrode output port P and the negative electrode output port N. Therefore, when the voltage between the positive electrode output port P and the negative electrode output port N is all applied to the capacitor C1, the capacitor C1 may undertake twice a voltage in a normal design, thereby causing an overvoltage damage. Further, a circuit and a device may be further damaged after the damage is further spread. Consequently, reliability of the circuit is greatly reduced. Similarly, when a short-circuit fault occurs on the semiconductor switch component: S1 and D2 at the same time, the positive electrode input port P' and the reference input port M' are connected in a short-circuit manner. If a connection relationship is maintained between the reference output port M and the reference input port M', the capacitor C1 is bypassed. In this case, a voltage between the positive electrode output port P and the negative electrode output port N is all applied to the capacitor C2, thereby causing an overvoltage damage. In this way, the connection relationship between the reference output port M and the reference input port M' needs to be adjusted through controlling on/off of the circuit break switch SP. Specifically, whether a short-circuit fault occurs on the semiconductor switch component may be determined through monitoring one of the following cases: A voltage between the negative electrode input port N' and the reference input port M' is monitored. When the voltage is less than a specific threshold, it is determined that the short-circuit fault occurs on the semiconductor switch component: S4 and D3 at the same time. Alternatively, a voltage between the positive electrode input port P' and the reference input port M' is monitored. When the voltage is less than a specific threshold, it is determined that the short-circuit fault occurs on the semiconductor switch component: S1 and D2 at the same time. Alternatively, a decrease rate of a voltage between the negative electrode input port N' and the reference input port M' is monitored. When the voltage decrease rate is greater than a specific threshold, it is determined that a short-circuit fault occurs on the semiconductor switch component: S4 and D3 at the same time. Alternatively, a decrease rate of a voltage between the positive electrode input port P' and the reference input port M' is monitored. When the voltage decrease rate is greater than a specific threshold, it is determined that a short-circuit fault occurs on the semiconductor switch component: S1 and D2 at the same time. Alternatively, a current flowing from the positive electrode input port P' to the negative electrode input port N' and passing through the semiconductor switch component: S1 or S4, or D2, or D3 is monitored. When the current is greater than a specific threshold, it is determined that the short-circuit fault occurs on the corresponding semiconductor switch component: S1 or S4, or D2, or D3. Alternatively, a voltage between a collector and an emitter is monitored when the semiconductor switch component: S1 or S4 is turned on. When the voltage is greater than a specific threshold, it is determined that a short-circuit fault occurs on the corresponding semiconductor switch component: S1 or S4. In this way, whether a short-circuit fault occurs on the NPC three-level bridge arm 830 may be determined through monitoring the foregoing cases, for example, monitoring a voltage and a current of a specific semiconductor switch component, and a connection relationship between the reference output port M and the reference input port M' is adjusted in time through controlling on/off of the circuit break switch SP, to avoid an overvoltage damage to a half-bus capacitor and improve reliability of a circuit. In addition, a current flowing through the circuit break switch SP may also be monitored. When the current is greater than a specific threshold, it is determined that the short-circuit fault occurs on the NPC three-level bridge arm 830.

Still with reference to FIG. 8, the NPC three-level circuit 800 may include a plurality of NPC three-level bridge arms 830. Each NPC three-level bridge arm 830 has the structure shown in FIG. 8. Each NPC three-level bridge arm 830 has three input ports. Input ports of each of the plurality of NPC three-level bridge arms 830 are connected in parallel to a corresponding positive electrode input port P', a corresponding negative electrode input port N', and a corresponding reference input port M' shown in FIG. 8. Therefore, a parallel connection relationship exists among the plurality of NPC three-level bridge arms 830. When the plurality of NPC three-level bridge arms 830 all work normally, the circuit break switch SP of the fault protection apparatus 810 is turned on. When the short-circuit fault occurs on any one of the plurality of NPC three-level bridge arms 830, the circuit break switch SP of the fault protection apparatus 810 is turned off, to avoid an overvoltage damage to a half-bus capacitor and improve reliability of the circuit. Whether the short-circuit fault occurs on any one of the plurality of NPC three-level bridge arms 830 may be determined through monitoring whether one of the foregoing cases occurs on each of the NPC three-level bridge arms 830.

It should be understood that a controller 811 included in the fault protection apparatus 810 is communicatively connected to the circuit break switch SP, and is configured to control on/off of the circuit break switch SP. The controller 811 may include a corresponding circuit and component to monitor the foregoing cases of the short-circuit fault, or may receive an instruction from the outside by using an interface circuit. In some example embodiments, the controller 811 may be provided separately from the fault protection apparatus 810, that is, provided as a separate component. In addition to the foregoing cases, another technical means may be further used to determine whether the short-circuit fault occurs on the semiconductor switch component. These may be adjusted and improved based on a specific application environment. This is not specifically limited herein.

It should be understood that the IGBTs are used as an example for the plurality of semiconductor switch components included in the NPC three-level bridge arm 830 shown in FIG. 8. FIG. 8 shows examples of a collector and an emitter of each of these semiconductor switch components. When these semiconductor switch components use a semiconductor switch component in another type, for example, a MOSFET, the collector and the emitter are correspondingly replaced with a drain and a source. Therefore, the collector and the emitter shown in FIG. 8 should be understood as example representations of a first transmission electrode and a second transmission electrode of each of the plurality of semiconductor switch components.

Figure 9:
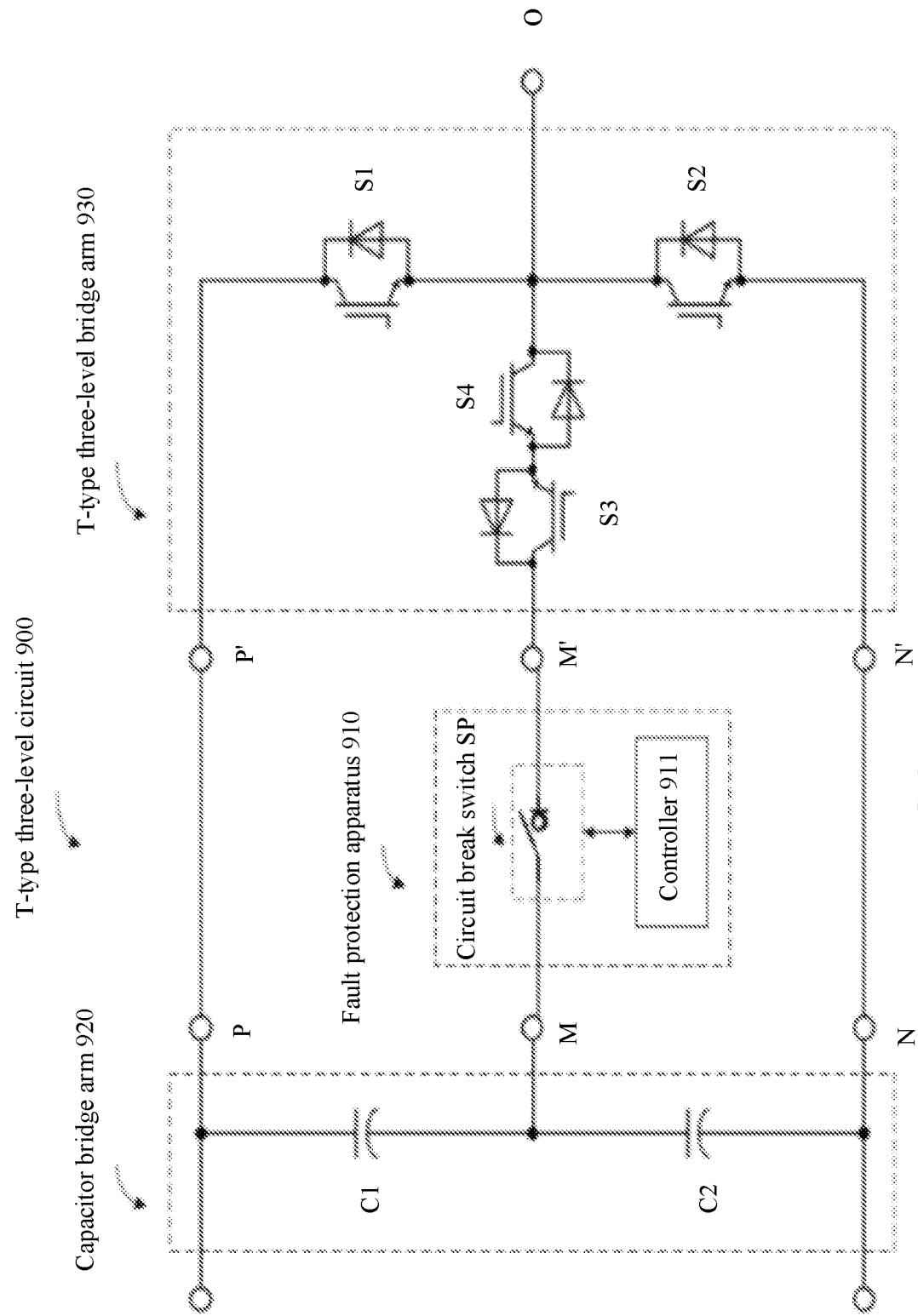
FIG. 9 is a block diagram of principles of a T-type three-level circuit including a fault protection apparatus according to an embodiment of this application.

FIG. 9 is a block diagram of principles of a T-type three-level circuit including a fault protection apparatus according to an embodiment of this application. As shown in FIG. 9, the T-type three-level circuit 900 includes a fault protection apparatus 910, a capacitor bridge arm 920, and a T-type three-level bridge arm 930. The fault protection apparatus 910 includes a circuit break switch SP. The circuit break switch SP shown in FIG. 9 may correspond to the circuit break switch SP shown in any one of the embodiments in FIG. 2 to FIG. 5 or any possible combination or variants of these embodiments. The capacitor bridge arm 920 has three output ports: respectively, a positive electrode output port P, a negative electrode output port N, and a reference output port M. Correspondingly, the T-type three-level bridge arm 930 has three input ports: respectively, a positive electrode input port P', a negative electrode input port N', and a reference input port M'. The T-type three-level bridge arm 930 further has an external output port O configured to provide an output voltage level for a next-level load or an external network. The positive electrode output port P is connected to the positive electrode input port P'. The negative electrode output port N is connected to the negative electrode input port N'. One end of the fault protection apparatus 910 is connected to the reference output port M, and the other end is connected to the reference input port M'. In this way, a one-to-one connection relationship exists between each output port of the capacitor bridge arm 920 and each input port of the T-type three-level bridge arm 930, and the reference output port M is indirectly connected to the reference input port M' by using the fault protection apparatus 910. It should be understood that a positive electrode and a negative electrode mentioned in this embodiment of this application are merely relative concepts. For ease of description, one port is designated as a positive electrode, and the other port is designated as a negative electrode. This should not be construed as a limitation.

Still with reference to FIG. 9, the capacitor bridge arm 920 includes two capacitors: C1 and C2. The capacitors: C1 and C2 are connected in series between the positive electrode output port P and the negative electrode output port N. An intermediate node between the capacitors: C1 and C2 is connected to the reference output port M. The T-type three-level bridge arm 930 includes a total of four semiconductor switch components, respectively labeled as S1, S2, S3, and S4. It should be understood that each of the semiconductor switch components: S1, S2, S3, and S4 included in the T-type three-level bridge arm 930 is a pair of IGBTs and diodes connected to the IGBTs in an anti-parallel connection relationship. In some example embodiments, these semiconductor switch components may alternatively be implemented by using another semiconductor component having similar functions, for example, a MOSFET, a GTR, a GTO, or another appropriate component. A pair of diodes is correspondingly configured. In some example embodiments, these semiconductor components may further use a HEMT, also referred to as a MODFET, or a 2-DEGFET, or an SDHT. These may be adjusted and improved based on a specific application environment. This is not specifically limited herein.

Still with reference to FIG. 9, the semiconductor switch components: S1 and S2 are connected in series between the positive electrode input port P' and the negative electrode input port N', and an intermediate node between the semiconductor switch components: S1 and S2 is connected to the external output port O. The semiconductor switch components: S3 and S4 are connected in series between the reference input port M' and the external output port O. The semiconductor switch components: S3 and S4 are connected in series in reverse directions between the reference input port M' and the external output port O. In other words, an emitter of S3 is connected to an emitter of S4, a collector of S3 is connected to the reference input port M', and a collector of S4 is connected to the external output port O. In another implementation, locations of S3 and S4 may also be interchanged, provided that the emitters of S3 and S4 are connected to each other, the collector of one of S3 and S4 is connected to the reference input port M', and the collector of the other one is connected to the external output port O. When the semiconductor switch component: S1 is turned on, the external output port O is connected to the positive electrode input port P' by using a branch including the semiconductor switch component: S1, and the positive electrode output port P is connected to the positive electrode input port P'. Therefore, a voltage output from the external output port O is a first voltage applied to the positive electrode output port P. When the semiconductor switch component: S2 is turned on, the external output port O is connected to the negative electrode input port N' by using a branch including the semiconductor switch component: S2, and the negative electrode output port N is connected to the negative electrode input port N'. Therefore, a voltage output from the external output port O is a second voltage applied to the negative electrode output port N. When the semiconductor switch components: S3 and S4 are turned on, the external output port O is connected to the reference input port M' by using a branch including the semiconductor switch components: S3 and S4, and the reference output port M is indirectly connected to the reference input port M' by using the fault protection apparatus 910. Therefore, a voltage output from the external output port O is a third voltage applied to the reference output port M. In this way, through controlling on/off of each semiconductor switch component included in the T-type three-level bridge arm 930, the voltage output from the external output port O can be switched among the first voltage applied to the positive electrode output port P, the second voltage applied to the negative electrode output port N, and the third voltage applied to the reference output port M, to implement three-level output.

Still with reference to FIG. 9, when a short-circuit fault occurs on the semiconductor switch components: S2, S3, and S4 at the same time, the negative electrode input port N' and the reference input port M' are connected in a short-circuit manner. If a connection relationship is maintained between the reference output port M and the reference input port M', the capacitor C2 is bypassed. In this case, a voltage between the positive electrode output port P and the negative electrode output port N is all applied to the capacitor C1. When a symmetrical design is applied to the capacitor bridge arm 920, the capacitors: C1 and C2 each undertake a half of the voltage between the positive electrode output port P and the negative electrode output port N. Therefore, when the voltage between the positive electrode output port P and the negative electrode output port N is all applied to the capacitor C1, the capacitor C1 may undertake twice a voltage in a normal design, thereby causing an overvoltage damage. Further, a circuit and a device may be further damaged after the damage is further spread. Consequently, reliability of the circuit is greatly reduced. Similarly, when a short-circuit fault occurs on the semiconductor switch components: S1, S3, and S4 at the same time, the positive electrode input port P' and the reference input port M' are connected in a short-circuit manner. If a connection relationship is maintained between the reference output port M and the reference input port M', the capacitor C1 is bypassed. In this case, a voltage between the positive electrode output port P and the negative electrode output port N is all applied to the capacitor C2, thereby causing an overvoltage damage. In this way, the connection relationship between the reference output port M and the reference input port M' needs to be adjusted through controlling on/off of the circuit break switch SP. Specifically, whether a short-circuit fault occurs on the semiconductor switch component may be determined through monitoring one of the following cases: A voltage between the negative electrode input port N' and the reference input port M' is monitored. When the voltage is less than a specific threshold, it is determined that the short-circuit fault occurs on the semiconductor switch components: S2, S3, and S4 at the same time. Alternatively, a voltage between the positive electrode input port P' and the reference input port M' is monitored. When the voltage is less than a specific threshold, it is determined that the short-circuit fault occurs on the semiconductor switch components: S1, S3, and S4 at the same time. Alternatively, a decrease rate of a voltage between the negative electrode input port N' and the reference input port M' is monitored. When the voltage decrease rate is greater than a specific threshold, it is determined that a short-circuit fault occurs on the semiconductor switch components: S2, S3, and S4 at the same time. Alternatively, a decrease rate of a voltage between the positive electrode input port P' and the reference input port M' is monitored. When the voltage decrease rate is greater than a specific threshold, it is determined that a short-circuit fault occurs on the semiconductor switch components: S1, S3, and S4 at the same time. Alternatively, a current flowing from the positive electrode input port P' to the negative electrode input port N' and passing through the semiconductor switch component: S1 or S2 is monitored. When the current is greater than a specific threshold, it is determined that the short-circuit fault occurs on the corresponding semiconductor switch component: S1 or S2. Alternatively, a voltage between a collector and an emitter is monitored when the semiconductor switch component: S1, S2, S3, or S4 is turned on. When the voltage is greater than a specific threshold, it is determined that a short-circuit fault occurs on the corresponding semiconductor switch component: S1, S2, S3, or S4. In this way, whether a short-circuit fault occurs on the T-type three-level bridge arm 930 may be determined through monitoring the foregoing cases, for example, monitoring a voltage and a current of a specific semiconductor switch component, and a connection relationship between the reference output port M and the reference input port M' is adjusted in time through controlling on/off of the circuit break switch SP, to avoid an overvoltage damage to a half-bus capacitor and improve reliability of a circuit. In addition, a current flowing through the circuit break switch SP may also be monitored. When the current is greater than a specific threshold, it is determined that the short-circuit fault occurs on the T-type three-level bridge arm 930.

Still with reference to FIG. 9, the T-type three-level circuit 900 may include a plurality of T-type three-level bridge arms 930. Each T-type three-level bridge arm 930 has the structure shown in FIG. 9. Each T-type three-level bridge arm 930 has three input ports. Input ports of each of the plurality of T-type three-level bridge arms 930 are connected in parallel to a corresponding positive electrode input port P', a corresponding negative electrode input port N', and a corresponding reference input port M' shown in FIG. 9. Therefore, a parallel connection relationship exists among the plurality of T-type three-level bridge arms 930. When the plurality of T-type three-level bridge arms 930 all work normally, the circuit break switch SP of the fault protection apparatus 910 is turned on. When the short-circuit fault occurs on any one of the plurality of T-type three-level bridge arms 930, the circuit break switch SP of the fault protection apparatus 910 is turned off, to avoid an overvoltage damage to a half-bus capacitor and improve reliability of the circuit. Whether the short-circuit fault occurs on any one of the plurality of T-type three-level bridge arms 930 may be determined through monitoring whether one of the foregoing cases occurs on each of the T-type three-level bridge arms 930.

It should be understood that a controller 911 included in the fault protection apparatus 910 is communicatively connected to the circuit break switch SP, and is configured to control on/off of the circuit break switch SP. The controller 911 may include a corresponding circuit and component to monitor the foregoing cases of the short-circuit fault, or may receive an instruction from the outside by using an interface circuit. In some example embodiments, the controller 911 may be provided separately from the fault protection apparatus 910, that is, provided as a separate component. In addition to the foregoing cases, another technical means may be further used to determine whether the short-circuit fault occurs on the semiconductor switch component. These may be adjusted and improved based on a specific application environment. This is not specifically limited herein.

It should be understood that the IGBTs are used as an example for the plurality of semiconductor switch components included in the T-type three-level bridge arm 930 shown in FIG. 9. FIG. 9 shows examples of a collector and an emitter of each of these semiconductor switch components. When these semiconductor switch components use a semiconductor switch component in another type, for example, a MOSFET, the collector and the emitter are correspondingly replaced with a drain and a source. Therefore, the collector and the emitter shown in FIG. 9 should be understood as example representations of a first transmission electrode and a second transmission electrode of each of the plurality of semiconductor switch components.

Figure 10:
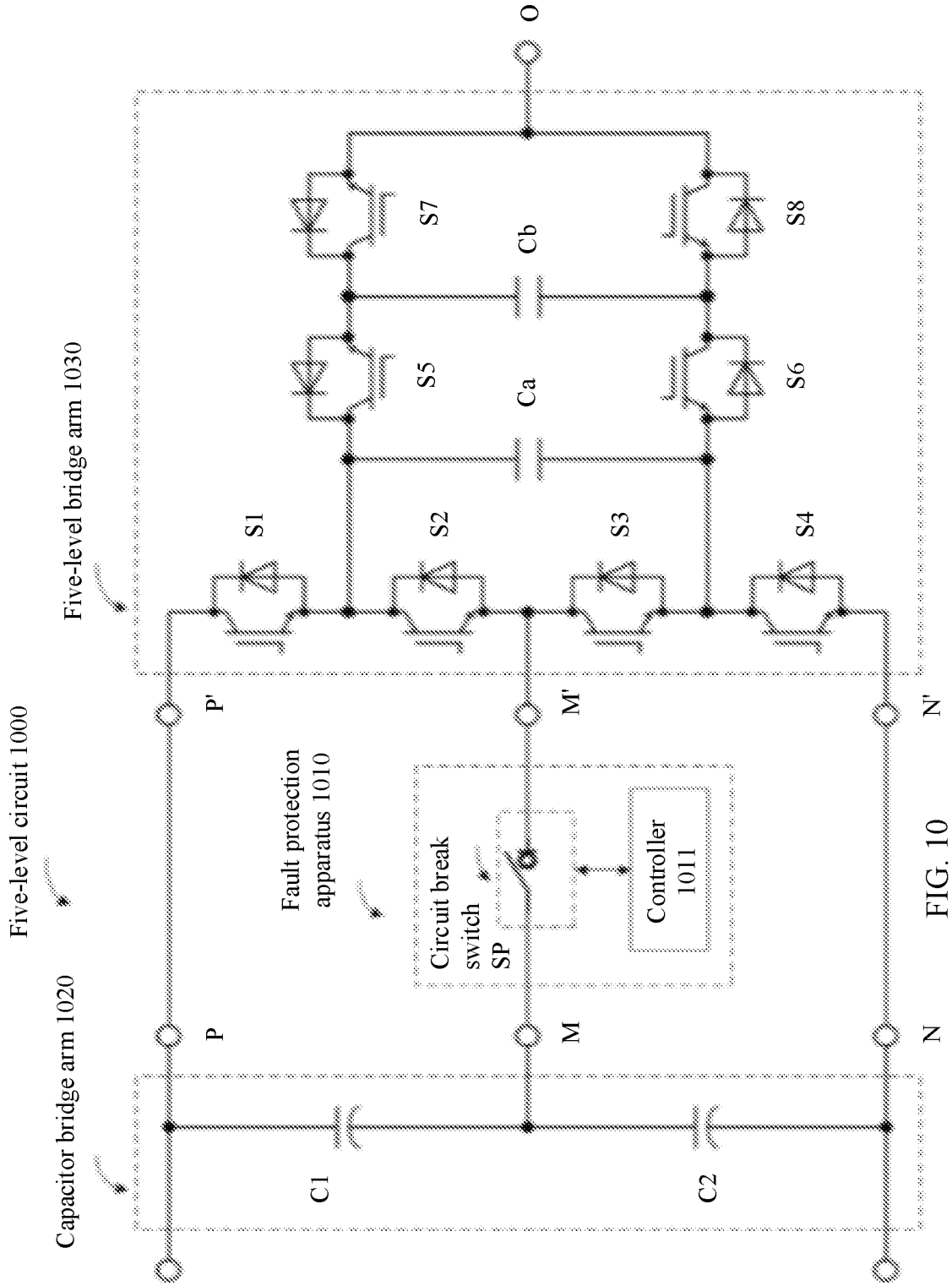
FIG. 10 is a block diagram of principles of a five-level circuit including a fault protection apparatus according to an embodiment of this application.

FIG. 10 is a block diagram of principles of a five-level circuit including a fault protection apparatus according to an embodiment of this application. As shown in FIG. 10, the five-level circuit 1000 includes a fault protection apparatus 1010, a capacitor bridge arm 1020, and a five-level bridge arm 1030. The fault protection apparatus 1010 includes a circuit break switch SP. The circuit break switch SP shown in FIG. 10 may correspond to the circuit break switch SP shown in any one of the embodiments in FIG. 2 to FIG. 5 or any possible combination or variants of these embodiments. The capacitor bridge arm 1020 has three output ports: respectively, a positive electrode output port P, a negative electrode output port N, and a reference output port M. Correspondingly, the five-level bridge arm 1030 has three input ports: respectively, a positive electrode input port P', a negative electrode input port N', and a reference input port M'. The five-level bridge arm 1030 further has an external output port O configured to provide an output voltage level for a next-level load or an external network. The positive electrode output port P is connected to the positive electrode input port P'. The negative electrode output port N is connected to the negative electrode input port N'. One end of the fault protection apparatus 1010 is connected to the reference output port M, and the other end is connected to the reference input port M'. In this way, a one-to-one connection relationship exists between each output port of the capacitor bridge arm 1020 and each input port of the five-level bridge arm 1030, and the reference output port M is indirectly connected to the reference input port M' by using the fault protection apparatus 1010. It should be understood that a positive electrode and a negative electrode mentioned in this embodiment of this application are merely relative concepts. For ease of description, one port is designated as a positive electrode, and the other port is designated as a negative electrode. This should not be construed as a limitation.

Still with reference to FIG. 10, the capacitor bridge arm 1020 includes two capacitors: C1 and C2. The capacitors: C1 and C2 are connected in series between the positive electrode output port P and the negative electrode output port N. An intermediate node between the capacitors: C1 and C2 is connected to the reference output port M. The five-level bridge arm 1030 includes a total of eight semiconductor switch components, respectively labeled as S1, S2, S3, S4, S5, S6, S7, and S8. It should be understood that each of the semiconductor switch components: S1, S2, S3, S4, S5, S6, S7, and S8 included in the five-level bridge arm 1030 is a pair of IGBTs and diodes connected to the IGBTs in an anti-parallel connection relationship. In some example embodiments, these semiconductor switch components may alternatively be implemented by using another semiconductor component having similar functions, for example, a MOSFET, a GTR, a GTO, or another appropriate component. A pair of diodes is correspondingly configured. In some example embodiments, these semiconductor components may further use a HEMT, also referred to as a MODFET, or a 2-DEGFET, or an SDHT. These may be adjusted and improved based on a specific application environment. This is not specifically limited herein.

Still with reference to FIG. 10, the semiconductor switch components: S1 and S2 are connected in series between the positive electrode input port P' and the reference input port M', and the semiconductor switch components: S3 and S4 are connected in series between the reference input port M' and the negative electrode input port N'. The semiconductor switch components: S2 and S3 are connected. An intermediate node between the semiconductor switch components: S2 and S3 is connected to the reference input port M'. The semiconductor switch components: S5 and S7 are connected in series, and then are respectively connected to an intermediate node between the semiconductor switch components: S1 and S2, and the external output port O of the five-level bridge arm 1030. The semiconductor switch components: S6 and S8 are connected in series, and then are respectively connected to an intermediate node between the semiconductor switch components: S3 and S4, and the external output port O of the five-level bridge arm 1030. The semiconductor switch components: S7 and S8 are connected. An intermediate node between the semiconductor switch components: S7 and S8 is connected to the external output port O of the five-level bridge arm 1030. The semiconductor switch components: S1, S2, S3, and S4 are connected in series between the positive electrode input port P' and the negative electrode input port N'. The semiconductor switch components: S5, S7, S8, and S6 are connected in series between the intermediate node between the semiconductor switch components: S1 and S2, and the intermediate node between the semiconductor switch components: S3 and S4. The five-level bridge arm 1030 further includes two capacitors: Ca and Cb. One end of the capacitor: Ca is connected to an intermediate node between the semiconductor switch components: S2 and S5, and the other end is connected to an intermediate node between the semiconductor switch components: S3 and S6. One end of the capacitor: Cb is connected to an intermediate node between the semi-conductor switch components: S5 and S7, and the other end is connected to an intermediate node between the semiconductor switch components: S6 and S8. When the semiconductor switch components: S1, S5, and S7 are turned on, the external output port O is connected to the positive electrode input port P' by using a branch including the semiconductor switch components: S1, S5, and S7, and the positive electrode output port P is connected to the positive electrode input port P'. Therefore, a voltage output from the external output port O is a first voltage applied to the positive electrode output port P. When the semiconductor switch components: S4, S6, and S8 are turned on, the external output port O is connected to the negative electrode input port N' by using a branch including the semiconductor switch components: S4, S6, and S8, and the negative electrode output port N is connected to the negative electrode input port N'. Therefore, a voltage output from the external output port O is a second voltage applied to the negative electrode output port N. When the semiconductor switch components: S2, S5, and S7 are turned on or when the semiconductor switch components: S3, S6, and S8 are turned on, the external output port O is connected to the reference input port M' by using a branch including the semiconductor switch components: S2, S5, and S7 or a branch including the semiconductor switch components: S3, S6, and S8, and the reference output port M is indirectly connected to the reference input port M' by using the fault protection apparatus 1010. Therefore, the voltage output from the external output port O is a third voltage applied to the reference output port M. In this way, through controlling on/off of each semiconductor switch component included in the five-level bridge arm 1030, the voltage output from the external output port O can be switched among the first voltage applied to the positive electrode output port P, the second voltage applied to the negative electrode output port N, and the third voltage applied to the reference output port M, to implement three-level output. In addition, by using a voltage division branch that may be formed by using the capacitors: Ca and Cb, or with reference to a design of a control signal, output of a fourth level and a fifth level is further provided. These may be implemented based on a conventional technology. Details are not described herein.

Still with reference to FIG. 10, when a short-circuit fault occurs on the semiconductor switch components: S3 and S4 at the same time, the negative electrode input port N' and the reference input port M' are connected in a short-circuit manner. If a connection relationship is maintained between the reference output port M and the reference input port M', the capacitor C2 is bypassed. In this case, a voltage between the positive electrode output port P and the negative electrode output port N is all applied to the capacitor C1. When a symmetrical design is applied to the capacitor bridge arm 1020, the capacitors: C1 and C2 each undertake a half of the voltage between the positive electrode output port P and the negative electrode output port N. Therefore, when the voltage between the positive electrode output port P and the negative electrode output port N is all applied to the capacitor C1, the capacitor C1 may undertake twice a voltage in a normal design, thereby causing an overvoltage damage. Further, a circuit and a device may be further damaged after the damage is further spread. Consequently, reliability of the circuit is greatly reduced. Similarly, when a short-circuit fault occurs on the semiconductor switch components: S1 and S2 at the same time, the positive electrode input port P' and the reference input port M' are connected in a short-circuit manner. If a connection relationship is maintained between the reference output port M and the reference input port M', the capacitor C1 is bypassed. In this case, a voltage between the positive electrode output port P and the negative electrode output port N is all applied to the capacitor C2, thereby causing an overvoltage damage. In this way, the connection relationship between the reference output port M and the reference input port M' needs to be adjusted through controlling on/off of the circuit break switch SP. Specifically, whether a short-circuit fault occurs on the semiconductor switch component may be determined through monitoring one of the following cases: A voltage between the negative electrode input port N' and the reference input port M' is monitored. When the voltage is less than a specific threshold, it is determined that the short-circuit fault occurs on the semiconductor switch components: S3 and S4 at the same time. Alternatively, a voltage between the positive electrode input port P' and the reference input port M' is monitored. When the voltage is less than a specific threshold, it is determined that the short-circuit fault occurs on the semiconductor switch components: S1 and S2 at the same time. Alternatively, a decrease rate of a voltage between the negative electrode input port N' and the reference input port M' is monitored. When the voltage decrease rate is greater than a specific threshold, it is determined that a short-circuit fault occurs on the semiconductor switch components: S3 and S4 at the same time. Alternatively, a decrease rate of a voltage between the positive electrode input port P' and the reference input port M' is monitored. When the voltage decrease rate is greater than a specific threshold, it is determined that a short-circuit fault occurs on the semiconductor switch components: S1 and S2 at the same time. Alternatively, a current flowing from the positive electrode input port P' to the negative electrode input port N' and passing through the semiconductor switch component: S1, S2, S3, or S4 is monitored. When the current is greater than a specific threshold, it is determined that the short-circuit fault occurs on the corresponding semiconductor switch component: S1, S2, S3, or S4. Alternatively, a voltage between a collector and an emitter is monitored when the semiconductor switch component: S1, S2, S3, or S4 is turned on. When the voltage is greater than a specific threshold, it is determined that a short-circuit fault occurs on the corresponding semiconductor switch component: S1, S2, S3, or S4. In this way, whether a short-circuit fault occurs on the five-level bridge arm 1030 may be determined through monitoring the foregoing cases, for example, monitoring a voltage and a current of a specific semiconductor switch component, and a connection relationship between the reference output port M and the reference input port M' is adjusted in time through controlling on/off of the circuit break switch SP, to avoid an overvoltage damage to a half-bus capacitor and improve reliability of a circuit. In addition, a current flowing through the circuit break switch SP may also be monitored. When the current is greater than a specific threshold, it is determined that the short-circuit fault occurs on the five-level bridge arm 1030.

It should be understood that a controller 1011 included in the fault protection apparatus 1010 is communicatively connected to the circuit break switch SP, and is configured to control on/off of the circuit break switch SP. The controller 1011 may include a corresponding circuit and component to monitor the foregoing cases of the short-circuit fault, or may receive an instruction from the outside by using an interface circuit. In some example embodiments, the controller 1011 may be provided separately from the fault protection apparatus 1010, that is, provided as a separate component. In addition to the foregoing cases, another technical means may be further used to determine whether the short-circuit fault occurs on the semiconductor switch component. These may be adjusted and improved based on a specific application environment. This is not specifically limited herein.

It should be understood that the IGBTs are used as an example for the plurality of semiconductor switch components included in the five-level bridge arm 1000 shown in FIG. 10. FIG. 10 shows examples of a collector and an emitter of each of these semiconductor switch components. When these semiconductor switch components use a semiconductor switch component in another type, for example, a MOSFET, the collector and the emitter are correspondingly replaced with a drain and a source. Therefore, the collector and the emitter shown in FIG. 10 should be understood as example representations of a first transmission electrode and a second transmission electrode of each of the plurality of semiconductor switch components.

A specific embodiment provided in this application may be implemented by any one or a combination of hardware, software, firmware, or a solid-state logic circuit, and may be implemented with reference to signal processing, control, and/or a dedicated circuit. The device or the apparatus provided in a specific embodiment of this application may include one or more processors (for example, a microprocessor, a controller, a digital signal processor (DSP), an application-specific integrated circuit (ASIC), or a field programmable gate array (FPGA)). These processors process various computer executable instructions to control an operation of the device or the apparatus. The device or the apparatus provided in a specific embodiment of this application may include a system bus or a data transmission system that couples all components together. The system bus may include any one of different bus structures or any combination of different bus structures, for example, a memory bus or a memory controller, a peripheral bus, a universal serial bus, and/or a processor or a local bus that uses any one of the plurality of bus structures. The device or apparatus provided in a specific embodiment of this application may be provided separately, may be a part of a system, or may be a part of another device or apparatus.

A specific embodiment provided in this application may include a computer-readable storage medium or be in combination with a computer-readable storage medium, for example, one or more storage devices that can provide non-temporary data storage. The computer-readable storage medium/storage device may be configured to store data, a programmer, and/or instructions. The device or apparatus is enabled to implement related operations by using the data, the programmer, and/or the instructions when a processor of the device or apparatus provided in the specific embodiment of this application executes the data, the programmer, and/or the instructions. The computer-readable storage medium/storage device may include one or more of the following features: volatile, non-volatile, dynamic, static, readable/writable, read-only, random access, sequential access, location addressable, file addressable, and content addressable. In one or more example embodiments, the computer-readable storage medium/storage device may be integrated into a device or an apparatus provided in a specific embodiment of this application, or belong to a common system. The computer-readable storage medium/storage device may include an optical storage device, a semiconductor storage device, a magnetic storage device, and/or the like; or may include a random access memory (RAM), a flash memory, a read-only memory (ROM), an erasable programmable read-only memory (EPROM), an electrically erasable programmable read-only memory (EEPROM), a register, a hard disk, a removable magnetic disk, a recordable and/or rewritable optical disk (CD), a digital versatile disc (DVD), a massive storage device, or an appropriate storage medium in any other form.

The foregoing provides specific embodiments of this application. It should be noted that sequential adjustment, combination, and deletion may be performed on the steps in the methods described in the specific embodiments of this application according to an actual requirement. In the foregoing embodiments, the description of each embodiment has respective focuses. For a part that is not described in detail in an embodiment, refer to related descriptions in other embodiments. It may be understood that the structure shown in the accompanying drawings and the embodiments of this application constitutes no specific limitation on the related apparatus or system. In some other embodiments of this application, the related apparatus or system may include more or fewer components than those shown in the specific embodiments and the accompanying drawings; or in the related apparatus or system, some components may be combined, or some components may be split, or components are disposed in different manners. A person skilled in the art understands that various adjustments or changes may be made to operations and details of the method and the device layout recorded in the specific embodiments without departing from the spirit and scope of the specific embodiments of this application; and several improvements and polishing may be further made without departing from the principle of this application. The improvements and polishing shall fall within the protection scope of this application.

What is claimed is:

1. A photovoltaic power generation system, wherein the photovoltaic power generation system comprises:
    a capacitor bridge arm, wherein the capacitor bridge arm comprises a positive electrode output port, a negative electrode output port, and a reference output port between the positive electrode output port and the negative electrode output port;
    an inverter bridge arm, wherein the inverter bridge arm comprises a positive electrode input port, a negative electrode input port, and a reference input port between the positive electrode input port and the negative electrode input port, the positive electrode input port is connected to the positive electrode output port, and the negative electrode input port is connected to the negative electrode output port; and
    a fault protection apparatus, wherein the fault protection apparatus is connected between the reference input port and the reference output port, and the fault protection apparatus is turned off based on a magnitude value or a variation of a voltage between the reference input port and the positive electrode input port or between the reference input port and the negative electrode input port, or a magnitude value or a variation of a current between the reference input port and the positive electrode input port or between the reference input port and the negative electrode input port,
    wherein the fault protection apparatus comprises a primary circuit breaker, the primary circuit breaker comprises a first switch transistor and a second switch transistor, the first switch transistor and the second switch transistor are connected in series in reverse directions between the reference output port and the reference input port, and the fault protection apparatus is turned on and turned off through controlling on and off states of the first switch transistor and the second switch transistor,
    wherein the fault protection apparatus further comprises a varistor,
    wherein the varistor and the primary circuit breaker are connected in parallel between the reference output port and the reference input port,
    wherein the fault protection apparatus further comprises a high-speed mechanical breaker, and
    wherein the high-speed mechanical breaker, the varistor, and the primary circuit breaker are connected in parallel between the reference output port and the reference input port, the high-speed mechanical breaker is turned on after the first switch transistor and the second switch transistor of the primary circuit breaker are turned on, and the high-speed mechanical breaker is turned off before the first switch transistor and the second switch transistor.

2. The photovoltaic power generation system according to claim 1, wherein that the fault protection apparatus is turned off based on the magnitude value or the variation of the voltage between the reference input port and the positive electrode input port or the negative electrode input port comprises:
    when the voltage between the negative electrode input port and the reference input port is less than a first threshold value, the fault protection apparatus is turned off; or
    when the voltage between the positive electrode input port and the reference input port is less than a second threshold value, the fault protection apparatus is turned off; or
    when a decrease rate of the voltage between the negative electrode input port and the reference input port is greater than a third threshold value, the fault protection apparatus is turned off; or
    when a decrease rate of the voltage between the positive electrode input port and the reference input port is greater than a fourth threshold value, the fault protection apparatus is turned off.

3. The photovoltaic power generation system according to claim 1, wherein the fault protection apparatus is further turned off based on a current flowing through the fault protection apparatus.

4. The photovoltaic power generation system according to claim 1, wherein the inverter bridge arm further comprises at least one semiconductor switch component connected between the reference input port and the positive electrode input port or the negative electrode input port, and the fault protection apparatus is further turned off based on a current flowing through the at least one semiconductor switch component or a voltage applied between a first transmission electrode and a second transmission electrode of the at least one semiconductor switch component.

5. The photovoltaic power generation system according to claim 1, wherein the inverter bridge arm comprises an active neutral point clamped (ANPC) three-level bridge arm, the ANPC three-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

6. The photovoltaic power generation system according to claim 1, wherein the inverter bridge arm comprises a neutral point clamped (NPC) three-level bridge arm, the NPC three-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

7. The photovoltaic power generation system according to claim 1, wherein the inverter bridge arm comprises a T-type three-level bridge arm, the T-type three-level bridge arm comprises a plurality of semiconductor switch components connected in series between the positive electrode input port and the negative electrode input port, and the fault protection apparatus is further turned off based on a current flowing through each of the plurality of semiconductor switch components or a voltage applied between a first transmission electrode and a second transmission electrode of each of the plurality of semiconductor switch components.

8. The photovoltaic power generation system according to claim 1, wherein the inverter bridge arm comprises a five-level bridge arm, the five-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

9. A photovoltaic power generation system, wherein the photovoltaic power generation system comprises:
 a capacitor bridge arm, wherein the capacitor bridge arm comprises a positive electrode output port, a negative electrode output port, and a reference output port between the positive electrode output port and the negative electrode output port;
 an inverter bridge arm, wherein the inverter bridge arm comprises a positive electrode input port, a negative electrode input port, and a reference input port between the positive electrode input port and the negative electrode input port, the positive electrode input port is connected to the positive electrode output port, and the negative electrode input port is connected to the negative electrode output port; and
 a fault protection apparatus, wherein the fault protection apparatus is connected between the reference input port and the reference output port, and the fault protection apparatus is turned off based on a magnitude value or a variation of a voltage between the reference input port and the positive electrode input port or between the reference input port and the negative electrode input port, or a magnitude value or a variation of a current between the reference input port and the positive electrode input port or between the reference input port and the negative electrode input port,
 wherein the fault protection apparatus comprises a primary circuit breaker, the primary circuit breaker comprises a first switch transistor and a second switch transistor, the first switch transistor and the second switch transistor are connected in series in reverse directions between the reference output port and the reference input port, and the fault protection apparatus is turned on and turned off through controlling on and off states of the first switch transistor and the second switch transistor,
 wherein the fault protection apparatus further comprises a varistor,
 wherein the varistor and the primary circuit breaker are connected in parallel between the reference output port and the reference input port,
 wherein the fault protection apparatus further comprises a high-speed mechanical breaker, and
 wherein the fault protection apparatus further comprises:
 a high-speed mechanical breaker, and
 an auxiliary circuit breaker, wherein the auxiliary circuit breaker comprises a third switch transistor and a fourth switch transistor, and the third switch transistor and the fourth switch transistor are connected in series in reverse directions, and are connected in series to the high-speed mechanical breaker between the reference output port and the reference input port;
 the high-speed mechanical breaker and the auxiliary circuit breaker are connected in series, and are connected in parallel to the varistor and the primary circuit breaker between the reference output port and the reference input port; and
 the third switch transistor and the fourth switch transistor of the auxiliary circuit breaker and the high-speed mechanical breaker are turned on after the first switch transistor and the second switch transistor of the primary circuit breaker are turned on, the high-speed mechanical breaker is turned off before the first switch transistor and the second switch transistor of the primary circuit breaker are turned off, and the third switch transistor and the fourth switch transistor of the auxiliary circuit breaker are turned off before the high-speed mechanical breaker is turned off.

10. The photovoltaic power generation system according to claim 9, wherein that the fault protection apparatus is turned off based on the magnitude value or the variation of the voltage between the reference input port and the positive electrode input port or the negative electrode input port comprises:
 when the voltage between the negative electrode input port and the reference input port is less than a first threshold value, the fault protection apparatus is turned off; or
 when the voltage between the positive electrode input port and the reference input port is less than a second threshold value, the fault protection apparatus is turned off; or
 when a decrease rate of the voltage between the negative electrode input port and the reference input port is greater than a third threshold value, the fault protection apparatus is turned off; or
 when a decrease rate of the voltage between the positive electrode input port and the reference input port is greater than a fourth threshold value, the fault protection apparatus is turned off.

11. The photovoltaic power generation system according to claim 9, wherein the fault protection apparatus is further turned off based on a current flowing through the fault protection apparatus.

12. The photovoltaic power generation system according to claim 9, wherein the inverter bridge arm further comprises at least one semiconductor switch component connected between the reference input port and the positive electrode input port or the negative electrode input port, and the fault protection apparatus is further turned off based on a current flowing through the at least one semiconductor switch component or a voltage applied between a first transmission electrode and a second transmission electrode of the at least one semiconductor switch component.

13. The photovoltaic power generation system according to claim 9, wherein the inverter bridge arm comprises an active neutral point clamped (ANPC) three-level bridge arm, the ANPC three-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

14. The photovoltaic power generation system according to claim 9, wherein the inverter bridge arm comprises a neutral point clamped (NPC) three-level bridge arm, the NPC three-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

15. The photovoltaic power generation system according to claim 9, wherein the inverter bridge arm comprises a T-type three-level bridge arm, the T-type three-level bridge arm comprises a plurality of semiconductor switch components connected in series between the positive electrode input port and the negative electrode input port, and the fault protection apparatus is further turned off based on a current flowing through each of the plurality of semiconductor switch components or a voltage applied between a first transmission electrode and a second transmission electrode of each of the plurality of semiconductor switch components.

16. The photovoltaic power generation system according to claim 9, wherein the inverter bridge arm comprises a five-level bridge arm, the five-level bridge arm comprises a first plurality of semiconductor switch components connected in series between the reference input port and the positive electrode input port, and a second plurality of semiconductor switch components connected in series between the reference input port and the negative electrode input port, and the fault protection apparatus is further turned off based on a current flowing through each of the first and second plurality of semiconductor switch components or a voltage applied between a first transmission electrode and a second transmission electrode of each of the first and second plurality of semiconductor switch components.

* * * * *